(12) United States Patent
Choi et al.

(10) Patent No.: US 12,397,701 B2
(45) Date of Patent: Aug. 26, 2025

(54) LIGHTING APPARATUS FOR VEHICLE AND CONTROL METHOD OF THE SAME

(71) Applicant: HYUNDAI MOBIS CO., LTD., Seoul (KR)

(72) Inventors: Hyoung Jin Choi, Yongin-si (KR); Seung Woo Baek, Yongin-si (KR); Ban Suk Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 327 days.

(21) Appl. No.: 18/145,939

(22) Filed: Dec. 23, 2022

(65) Prior Publication Data

US 2023/0406192 A1   Dec. 21, 2023

(30) Foreign Application Priority Data

Jun. 21, 2022 (KR) .................. 10-2022-0075438
Jun. 21, 2022 (KR) .................. 10-2022-0075439
Jun. 21, 2022 (KR) .................. 10-2022-0075440

(51) Int. Cl.

| | | |
|---|---|---|
| G06F 7/00 | (2006.01) |
| B60Q 1/00 | (2006.01) |
| B60Q 1/02 | (2006.01) |
| B60Q 5/00 | (2006.01) |
| B60R 11/04 | (2006.01) |
| F21S 41/657 | (2018.01) |
| F21V 23/04 | (2006.01) |
| G01S 17/89 | (2020.01) |
| G01S 17/931 | (2020.01) |

(52) U.S. Cl.
CPC ............. B60Q 1/02 (2013.01); B60Q 1/0023 (2013.01); B60Q 5/006 (2013.01); B60R 11/04 (2013.01); F21S 41/657 (2018.01); F21V 23/0442 (2013.01); G01S 17/89 (2013.01); G01S 17/931 (2020.01)

(58) Field of Classification Search
CPC ........ B60Q 1/02; B60Q 1/0023; B60Q 5/006; F21S 41/657; G01S 17/931; G01S 17/89; B60R 11/04; F21V 23/0442
See application file for complete search history.

(56) References Cited

U.S. PATENT DOCUMENTS 10,446,021 B2 * 10/2019 Carrasco ................. G08G 1/166
2019/0230324 A1 * 7/2019 Chien ...................... F21K 9/232
2022/0229183 A1 * 7/2022 Chang ..................... G01S 7/486

FOREIGN PATENT DOCUMENTS

KR       10-1789652 B1   10/2017

* cited by examiner

*Primary Examiner* — Adam M Alharbi
(74) *Attorney, Agent, or Firm* — NovoTechIP International PLLC

(57) ABSTRACT

A lighting apparatus for a vehicle may include: a first body mounted on a vehicle body, a second body rotatably installed in the first body, a driving unit configured to rotate the second body, a lighting unit rotated along with the second body and configured to radiate a lighting signal to an outside of the vehicle, a speaker unit rotated along with the second body and configured to output an acoustic signal to the outside of the vehicle.

17 Claims, 20 Drawing Sheets

LIGHTING APPARATUS FOR VEHICLE AND CONTROL METHOD OF THE SAME

CROSS-REFERENCE TO RELATED APPLICATIONS

This application claims priority from and the benefit of Korean Patent Application Nos. 10-2022-0075440, 10-2022-0075438, and 10-2022-0075439 filed on Jun. 21, 2022, which are hereby incorporated by reference for all purposes as if set forth herein.

BACKGROUND

Technical Field

Exemplary embodiments of the present disclosure relate to a lighting apparatus for a vehicle and a method of controlling the same, and more particularly, to a lighting apparatus for a vehicle, which can transfer a signal to a surrounding vehicle, a surrounding driver, or a surrounding pedestrian, and a method of controlling the same.

Discussion of the Background

In general, various types of lighting apparatuses for easily confirming an object around a vehicle and notifying a surrounding vehicle, a surrounding pedestrian, etc. of a state of the vehicle or transferring a signal to the surrounding vehicle, the surrounding pedestrian, etc. when the vehicle travels is installed in the vehicle.

However, a conventional lighting apparatus has a limited type of signal which may be transferred because the signal is transferred through only the on and off of an LED, and has a problem in that a signal is clearly transferred because only a rather planar image can be transferred. Furthermore, in a daytime condition in which an illuminance value outside a vehicle is high, there is a problem in that the transfer of a signal by only the on and off of the LED has low visibility.

The Background of the present disclosure was disclosed in Korean Patent No. 10-1789652 (issued on Oct. 18, 2017) entitled "LED LAMP OF A VEHICLE".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to providing a lighting apparatus for a vehicle, which can transfer an acoustic signal in addition to a lighting signal by light, and a method of controlling the same.

A lighting apparatus for a vehicle may include a first body mounted on a vehicle body; a second body rotatably installed in the first body; a driving unit configured to rotate the second body; a lighting unit rotated along with the second body and configured to radiate a lighting signal to an outside of the vehicle; a speaker unit rotated along with the second body and configured to output an acoustic signal to the outside of the vehicle.

Furthermore, the lighting apparatus may further include a sensor unit configured to detect a state of the vehicle and surrounding information of the vehicle; and a control unit configured to determine an operation mode by receiving the information detected by the sensor unit and to control operations of the driving unit, the lighting unit, and the speaker unit based on the determined operation mode.

Furthermore, the sensor unit may include at least any one of: a driving detection sensor configured to detect a driving state of the vehicle; an object detection sensor configured to detect an object around the vehicle; a distance detection sensor configured to detect a distance between the vehicle and a driver terminal; or a danger detection sensor configured to detect a dangerous situation of the vehicle.

Furthermore, the object detection sensor may include a plurality of LIDAR sensors fixed to the first body and configured to obtain a three-dimensional (3-D) image around the vehicle; and a camera module rotated along with the second body and configured to capture an image around the vehicle.

Furthermore, the plurality of the LIDAR sensors may be disposed to be spaced apart from each other in a circumferential direction of the first body.

Furthermore, the lighting unit may include a first lighting unit coupled to the second body and configured to radiate an optical image toward a road surface; a second lighting unit coupled to the second body and configured to display a set color toward the outside of the vehicle.

Furthermore, the first lighting unit may be disposed to be inclined at a given angle toward a lower side of the second body.

Furthermore, the lighting unit may further include a third lighting unit coupled to the first body and configured to form a beam pattern toward the outside of the vehicle.

Furthermore, the second body may be rotatably installed around a direction perpendicular to a ground as an axis.

Furthermore, a grill unit configured to transmit, toward an outside of the second body, the lighting signal radiated by the lighting unit and the acoustic signal output by the speaker unit may be formed in the second body.

Furthermore, the speaker unit may be disposed to be inclined at a given angle toward an upper side of the second body.

A method of controlling a lighting apparatus for a vehicle may include detecting, by a sensor unit, a pedestrian located in front of a vehicle; determining, by a control unit, a walking path of the pedestrian based on information detected by the sensor unit; and outputting, by the control unit, a lighting signal and an acoustic signal to the walking path of the pedestrian by operating a driving unit, a lighting unit, and a speaker unit.

Furthermore, the lighting unit may include a first lighting unit coupled to a second body which is rotatably installed in a first body, and configured to radiate an optical image toward a road surface; and a second lighting unit coupled to the second body and configured to display a set color toward an outside of the vehicle under control of the control unit.

Furthermore, the outputting of the lighting signal and the acoustic signal to the walking path of the pedestrian may include calculating, by the control unit, a rotation angle of the second body based on the walking path of the pedestrian; rotating, by the control unit, the second body at a calculated rotation angle by operating the driving unit; radiating, by the control unit, the optical image toward the road surface by operating the first lighting unit; and outputting, by the control unit, the acoustic signal toward the pedestrian by operating the speaker unit.

Furthermore, the method may further include detecting, by the sensor unit, a change in the location of the pedestrian; determining, by the control unit, whether a walking of the pedestrian has been completed; correcting, by the control unit, the calculated rotation angle of the second body based on the changed location of the pedestrian if it is determined that the walking of the pedestrian has not been completed; and rotating, by the control unit, the second body at a corrected rotation angle by operating the driving unit.

A method of controlling a lighting apparatus for a vehicle may include detecting, by a sensor unit, a driving state of a vehicle and a moving object around the vehicle, determining, by a control unit, a collision possibility between the vehicle and the moving object based on the driving state of the vehicle and a location of the moving object, and outputting, by the control unit, a lighting signal and an acoustic signal toward the moving object by operating a driving unit, a lighting unit, and a speaker unit, when determining that the collision possibility between the vehicle and the moving object is present.

Furthermore, the lighting unit may include a first lighting unit rotatably installed in a first body, coupled to a second body rotated in association with driving power of the driving unit, and configured to radiate an optical image toward a road surface, and a second lighting unit coupled to the second body and configured to display a set color toward the outside of the vehicle.

Furthermore, the outputting of the lighting signal and the acoustic signal toward the moving object may include calculating, by the control unit, a rotation angle of the second body based on the location of the moving object, rotating, by the control unit, the second body at a calculated rotation angle by operating the driving unit, radiating, by the control unit, an optical image toward a road surface where the moving object is located by operating the first lighting unit, and outputting, by the control unit, an acoustic signal toward the moving object by operating the speaker unit.

Furthermore, the method may further include detecting, by the sensor unit, a change in the location of the moving object, and determining, by the control unit, whether an avoidance of the moving object has been completed based on a changed location of the moving object.

Furthermore, the method may further include correcting, by the control unit, the calculated rotation angle of the second body based on the changed location of the moving object, when determining that the avoidance of the moving object has not been completed, and rotating, by the control unit, the second body at a corrected rotation angle by operating the driving unit.

The lighting apparatus for a vehicle and the method of controlling the same according to embodiments of the present disclosure can perform efficient communication with a surrounding vehicle, a surrounding driver, a surrounding pedestrian, a surrounding animal, etc. through a combination of a lighting signal by the lighting unit and an acoustic signal by the speaker unit.

Furthermore, the lighting apparatus for a vehicle and the method of controlling the same according to embodiments of the present disclosure can perform consistent communication with a moving object because the radiation directions and output directions of the lighting unit and the speaker unit can be actively changed by the rotation of the second body.

DETAILED DESCRIPTION OF THE ILLUSTRATED EMBODIMENTS

Figure 1:
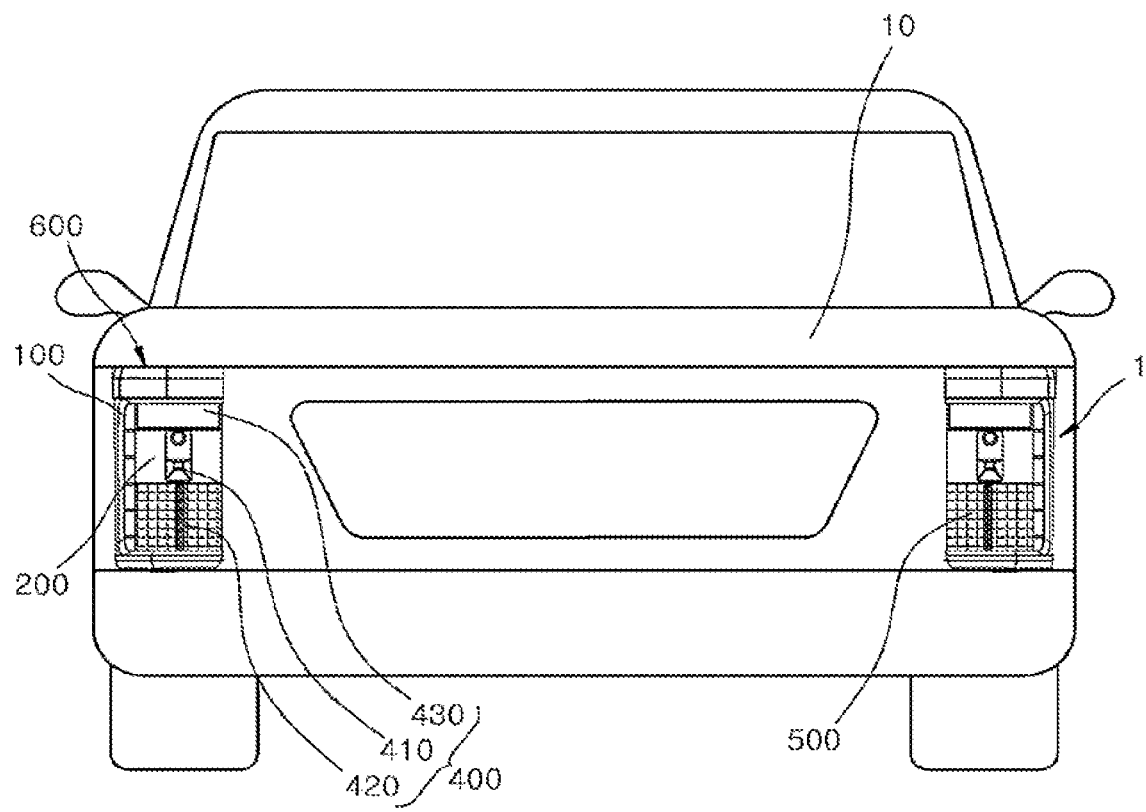
FIG. 1 is a diagram schematically illustrating the state in which a lighting apparatus for a vehicle according to an embodiment of the present disclosure has been installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
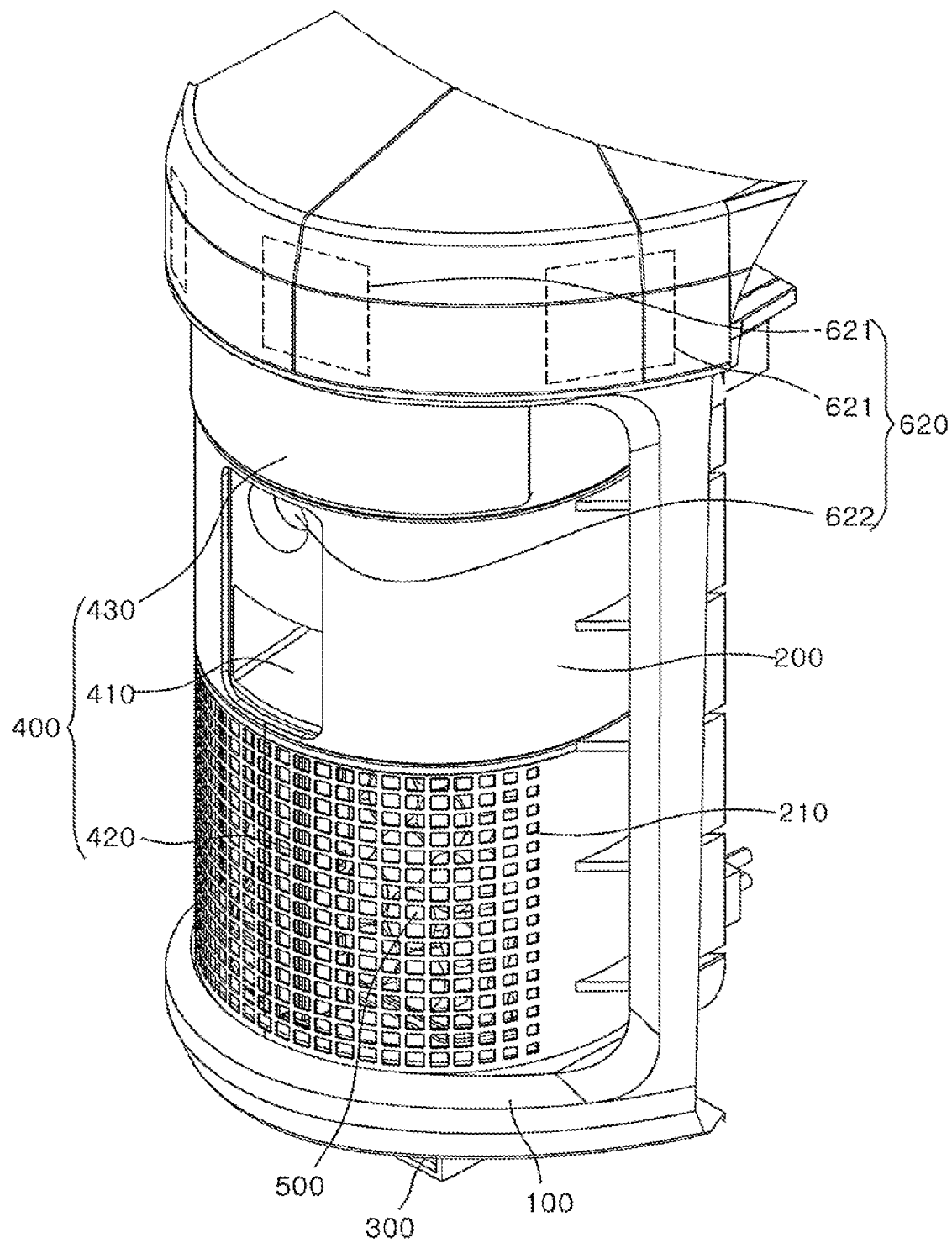
FIG. 2 is a perspective view schematically illustrating a construction of the lighting apparatus for a vehicle according to an embodiment of the present disclosure.
Figure 3:
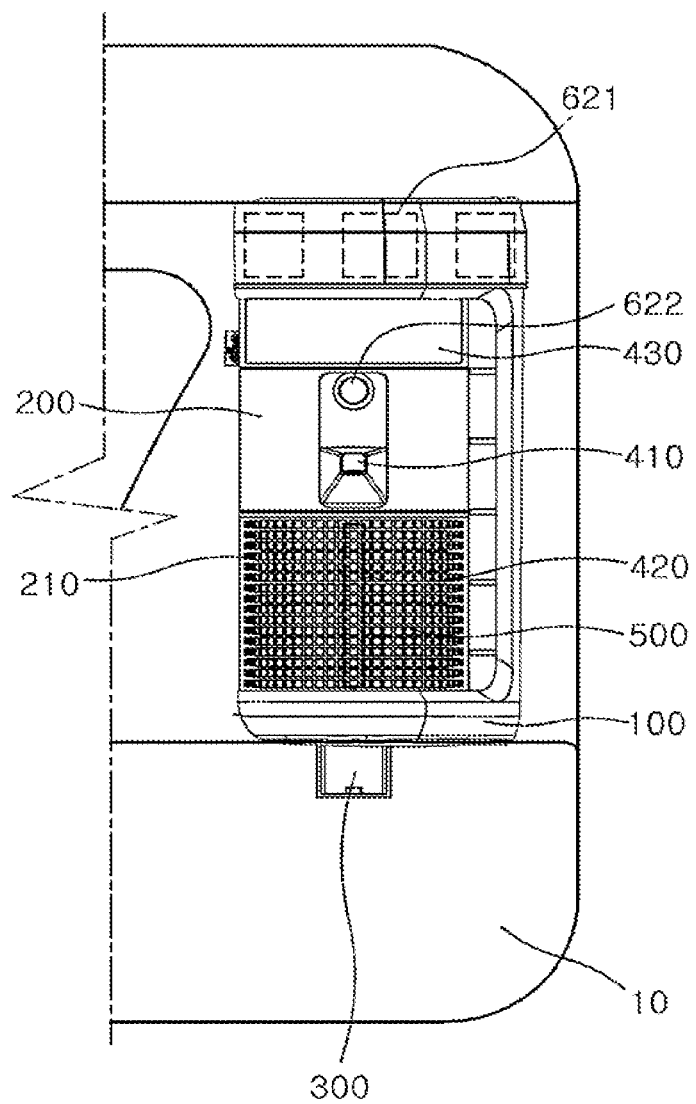
FIG. 3 is a front view schematically illustrating a construction of the lighting apparatus for a vehicle according to an embodiment of the present disclosure.
Figure 4:
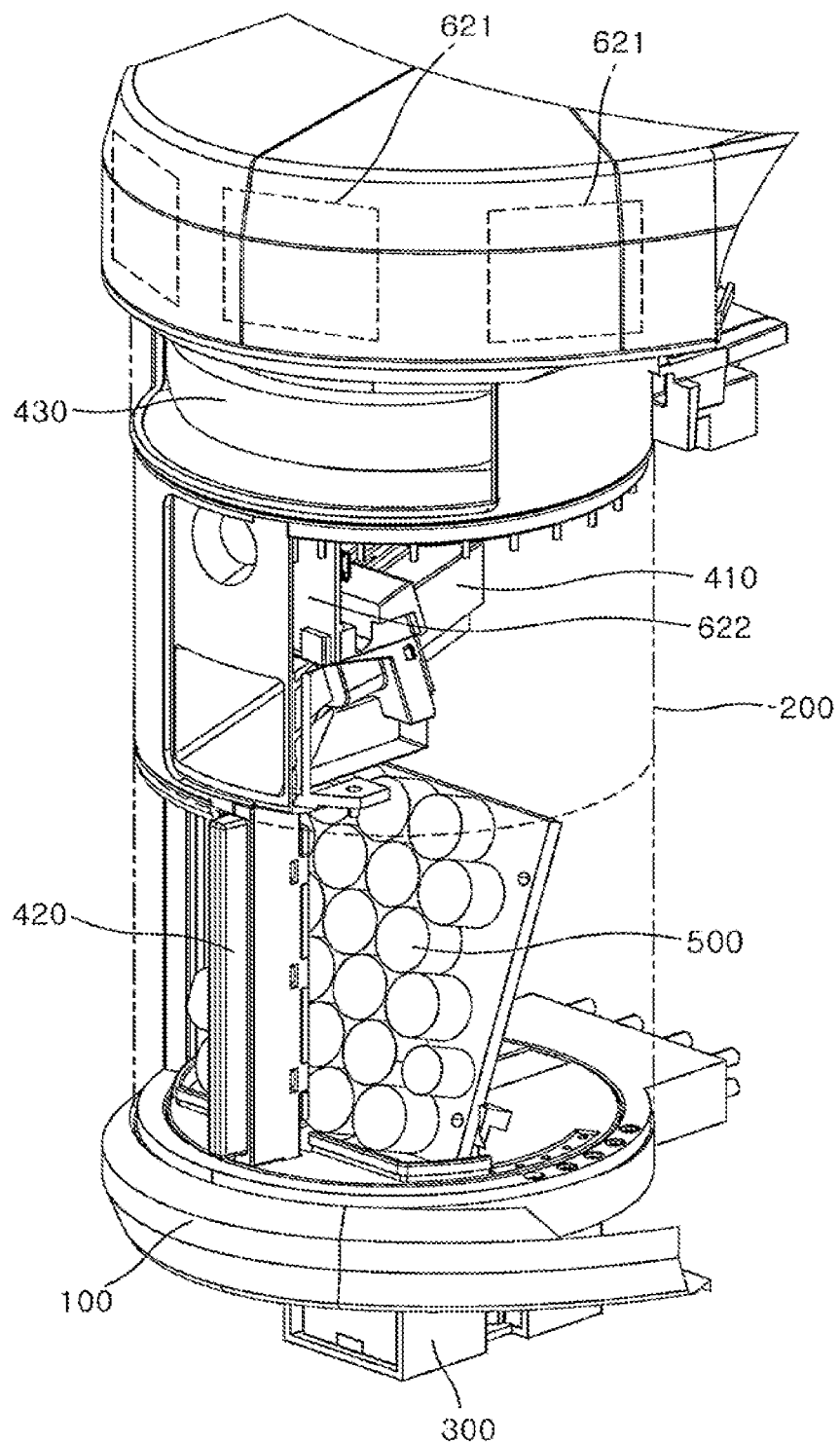
FIG. 4 is a perspective view schematically illustrating an internal construction of the lighting apparatus for a vehicle according to an embodiment of the present disclosure.
Figure 5:
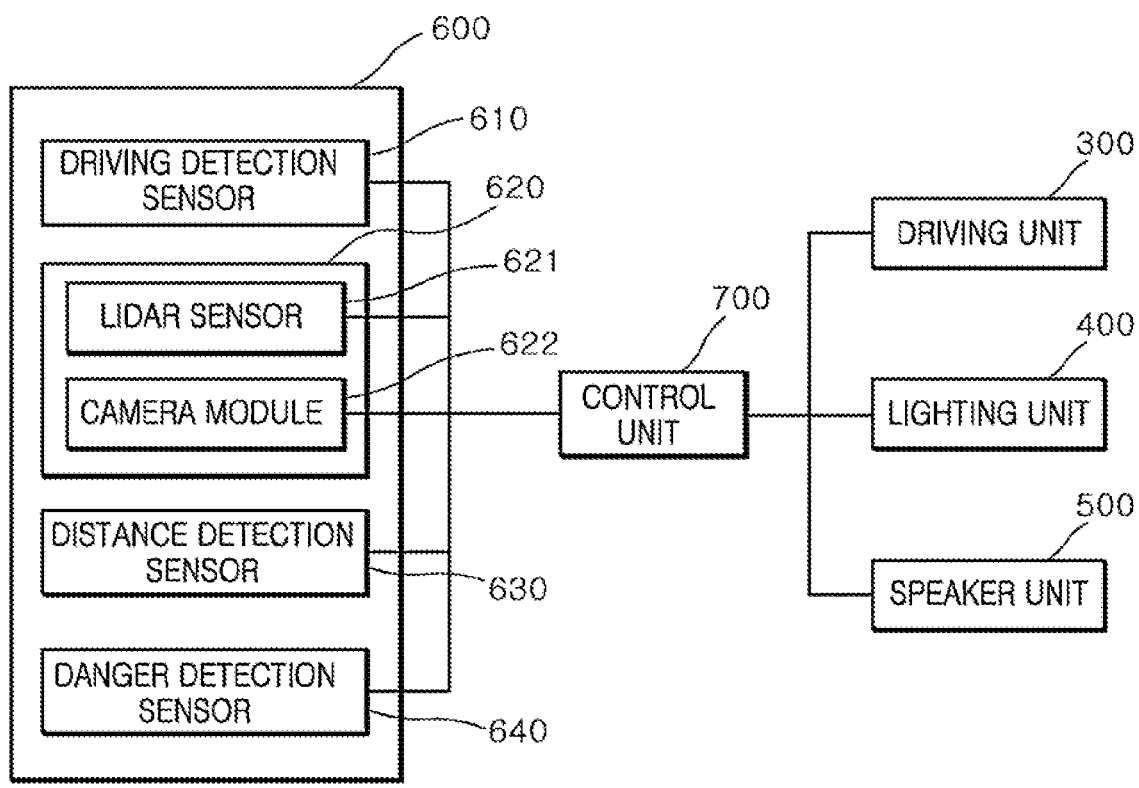
FIG. 5 is a block diagram schematically illustrating a construction of the lighting apparatus for a vehicle according to an embodiment of the present disclosure.

FIG. 1 is a diagram schematically illustrating the state in which a lighting apparatus for a vehicle according to an embodiment of the present disclosure has been installed. FIG. 2 is a perspective view schematically illustrating a construction of the lighting apparatus for a vehicle according to an embodiment of the present disclosure. FIG. 3 is a front view schematically illustrating a construction of the lighting apparatus for a vehicle according to an embodiment of the present disclosure. FIG. 4 is a perspective view schematically illustrating an internal construction of the lighting apparatus for a vehicle according to an embodiment of the present disclosure. FIG. 5 is a block diagram schematically illustrating a construction of the lighting apparatus for a vehicle according to an embodiment of the present disclosure.

Referring to FIGS. 1 to 4, the lighting apparatus 1 for a vehicle according to an embodiment of the present disclosure includes a first body 100, a second body 200, a driving unit 300, a lighting unit 400, a speaker unit 500, a sensor unit 600, and a control unit 700.

The first body 100 is mounted on a vehicle body 10, and supports the second body 200. The first body 100 according to an embodiment of the present disclosure may be formed in the form of a barrel having one side opened and the inside emptied. The first body 100 may be integrally coupled to the vehicle body by welding or may be detachably coupled to the vehicle body by bolting. The opened side of the first body 100 is disposed toward the outside of the vehicle body 10. FIG. 1 illustrates that the first body 100 has been mounted on the front of the vehicle body 10 as an example, but the first body 100 is not limited to such a location and may be mounted on the back of the vehicle body 10 or on the side of the vehicle body 10.

The second body 200 is rotatably installed in the first body 100. The second body 200 according to an embodiment of the present disclosure may be formed to have a cylindrical shape having the inside emptied. The second body 200 is disposed within the first body 100, and both ends of the second body 200 on the upper and lower sides thereof are rotatably connected to the first body 100. In this case, the second body 200 may be rotatably supported by the first body 100 by using a direction perpendicular to the ground as an axis.

A grill unit 210 for transmitting, toward the outside of the second body 200, a lighting signal radiated by the lighting unit 400 that is described later and an acoustic signal output by the speaker unit 500 that is described later may be formed in the second body 200. The grill unit 210 according to an embodiment of the present disclosure may be formed to have a shape in which a plurality of pattern grooves formed to penetrate the second body 200 is arranged in a lattice form. The grill unit 210 is formed along the lower circumference surface of the second body 200, and is disposed to face an external space of the vehicle body 10. The design of the plurality of pattern grooves that forms the grill unit 210 may be changed into various shapes, such as a triangle, a circle, and an ellipse, in addition to the quadrangle illustrated in FIG. 2.

The driving unit 300 rotates the second body 200 by generating driving power. The driving unit 300 according to an embodiment of the present disclosure may be exemplified as a step motor that generates rotatory power by being supplied with power from the outside. The driving unit 300 may be supplied with power from a battery, etc. of the vehicle. The driving unit 300 is coupled to and supported by the bottom of the first body 100. In this case, the driving unit 300 may be integrally coupled to the first body 100 by welding or may be detachably coupled to the first body 100 by bolting. The output axis of the driving unit 300 is connected to the second body 200. Accordingly, the driving unit 300 may relatively rotate the second body 200 around the first body 100 by transferring rotatory power to the second body 200 through the medium of the output axis. In this case, the output axis of the driving unit 300 may be directly connected to the second body 200, and may be indirectly connected to the second body 200 through the medium of a separate decelerator. The output axis of the driving unit 300 is disposed in a direction parallel to the center axis of the second body 200, that is, the direction perpendicular to the ground. The driving unit 300 is electrically connected to the control unit 700 that is described later. Whether the driving power will be generated, the direction of the driving power, etc. may be controlled by the control unit 700.

The lighting unit 400 is rotated along with the second body 200, and radiates a lighting signal to the outside of the vehicle.

The lighting unit 400 according to an embodiment of the present disclosure includes a first lighting unit 410, a second lighting unit 420, and a third lighting unit 430.

The first lighting unit 410 is coupled to the second body 200, and radiates an optical image toward a road surface.

Figure 6:
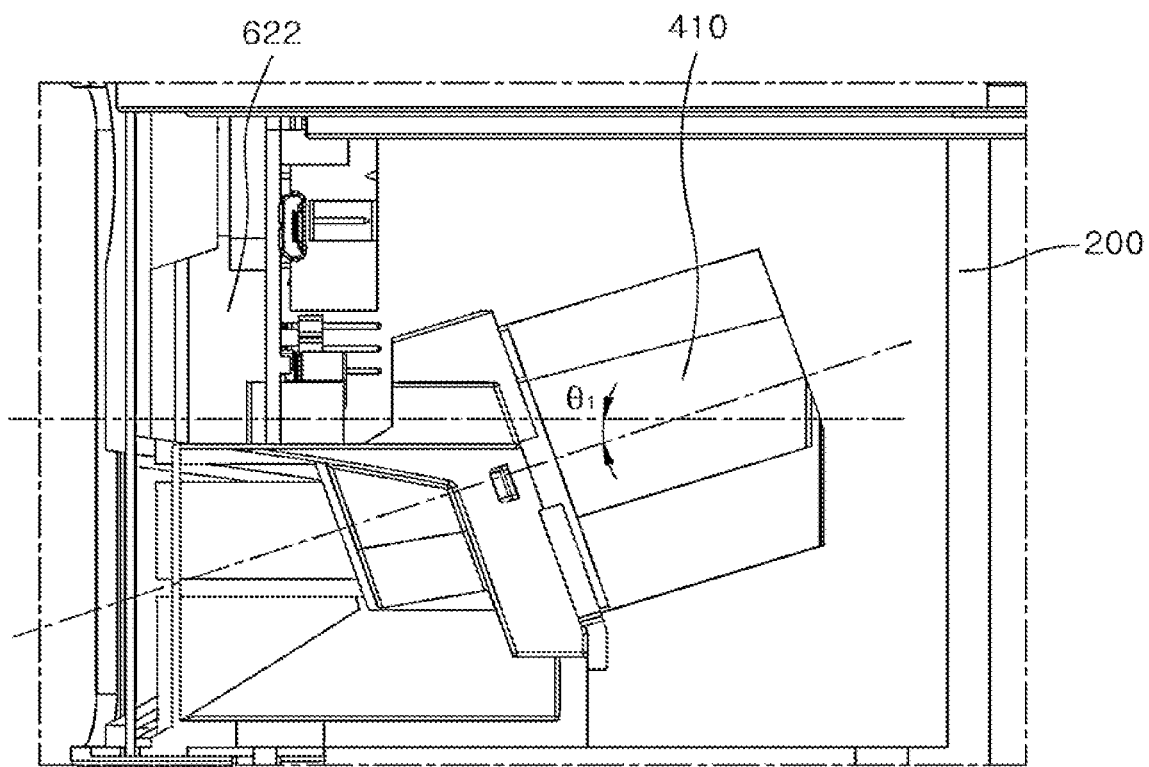
FIG. 6 is an enlarged view schematically illustrating a construction of a first lighting unit according to an embodiment of the present disclosure.

FIG. 6 is an enlarged view schematically illustrating a construction of the first lighting unit according to an embodiment of the present disclosure.

Referring to FIGS. 1 to 6, the first lighting unit 410 according to an embodiment of the present disclosure may be exemplified as a projection apparatus for projecting an image that is printed on a film or a beam projector for projecting a recorded digital image. The first lighting unit 410 is disposed to be located over the second lighting unit 420 and the speaker unit 500 that are described later within the second body 200. The first lighting unit 410 may be integrally coupled to the second body 200 by welding or may be detachably coupled to the second body 200 by bolting. The first lighting unit 410 is rotated at the same angular speed and angle as the second body 200 when the second body 200 is rotated. The first lighting unit 410 is disposed to be inclined at a given angle toward the lower side of the second body 200. That is, the first lighting unit 410 is disposed so that the central axis of a lens that radiates an optical image is inclined at a given angle 61 downward from a direction transverse to the ground. Accordingly, the first lighting unit 410 may induce the optical image that is radiated to the outside of the vehicle to be displayed on a road surface. As illustrated in FIG. 3, the first lighting unit 410 is disposed so that the central axis of the lens that radiates the optical image passes through a center line that symmetrically divides the grill unit 210.

An image that is radiated by the first lighting unit 410 may include a symbol such as an arrow image, a picture such as a crosswalk image, text such as "HELLO", a pattern such as a logo or an emblem, or a combination of them. Accordingly, the first lighting unit 410 may be used to guide and indicate the walking of a pedestrian based on the radiated image, may be used for the purpose of a welcome function that the vehicle welcomes a driver when the driver approaches the vehicle, or may be used to assign aesthetic sensibility. The first lighting unit 410 is electrically connected to the control unit 700 that is described later, and an operating state thereof may be controlled by the control unit 700. The first lighting unit 410 may change the plurality of optical images that is radiated toward the road surface under the control of the control unit 700.

The second lighting unit 420 is coupled to the second body 200, and radiates light having a color to the outside of the vehicle. The second lighting unit 420 is provided to be capable of displaying a plurality of colors. The second lighting unit 420 is electrically connected to the control unit 700 that is described later, and displays a set color toward the outside of the vehicle under the control of the control unit 700. The second lighting unit 420 according to an embodiment of the present disclosure may be exemplified as a red green blue (RGB) light-emitting diode (LED) light capable of displaying a plurality of colors. The second lighting unit 420 is disposed to be located under the first lighting unit 410 within the second body 200. The second lighting unit 420 may be integrally coupled to the second body 200 by welding or may be detachably coupled to the second body 200 by bolting. The second lighting unit 420 is rotated at the same angular speed and angle as the second body 200 when the second body 200 is rotated. The second lighting unit 420 is formed so that a length direction thereof is extended in the direction perpendicular to the ground. The second lighting unit 420 is disposed so that a light-emitting surface thereof faces the center line that symmetrically divides the grill unit 210.

The second lighting unit 420 may display a first color, a second color, and a third color toward the outside of the vehicle under the control of the control unit 700. In this case, the first color to the third color may be exemplified as green, blue, and red, but are not limited to such contents and may be variously changed in design within a range of colors which may be distinguished from one another.

More specifically, when the control unit 700 determines that the vehicle is now in an autonomous driving state, the second lighting unit 420 may display the first color toward the outside of the vehicle under the control of the control unit 700. Accordingly, the second lighting unit 420 may enable a pedestrian outside the vehicle or a driver who gets in another vehicle to easily recognize that the vehicle is now in the autonomous driving state.

Furthermore, when the control unit 700 determines that the sensor unit 600 correctly recognizes a driver around the vehicle or an object, such as a pedestrian, and is in the state in which the sensor unit 600 is tracking a corresponding object, the second lighting unit 420 may display the second color toward the outside of the vehicle under the control of the control unit 700. Accordingly, the second lighting unit 420 can provide a psychological safety feel to the driver outside the vehicle or the object, such as a pedestrian, by displaying that the vehicle now certainly recognizes the driver outside the vehicle or the object, such as a pedestrian, with respect to the driver or the object.

Furthermore, when the control unit 700 determines that the vehicle is now in a dangerous situation, such as damage, theft, or intrusion, the second lighting unit 420 may display the third color toward the outside of the vehicle under the control of the control unit 700. Accordingly, the second lighting unit 420 may arouse attention to an object that has caused the dangerous situation of the vehicle and induce the dangerous situation to be solved, by displaying that the vehicle now recognizes the dangerous situation with respect to the object that has caused the dangerous situation of the vehicle.

The third lighting unit 430 is coupled to the first body 100, and forms a beam pattern, such as a low beam or a high beam, toward the outside of the vehicle. The third lighting unit 430 according to an embodiment of the present disclosure may be exemplified as a head lamp of the existing vehicle that is constructed to include a light source, a reflector, a lens, etc. and that brightens a path along which the vehicle travels. The third lighting unit 430 may be disposed to be located over the second body 200 within the first body 100. The third lighting unit 430 may be integrally coupled to the first body 100 by welding or may be detachably coupled to the first body 100 by bolting. The third lighting unit 430 is electrically connected to the control unit 700, and a turn-on state and turn-on mode thereof may be controlled by the control unit 700.

The speaker unit 500 is rotated along with the second body 200, and outputs an acoustic signal to the outside of the vehicle.

Figure 7:
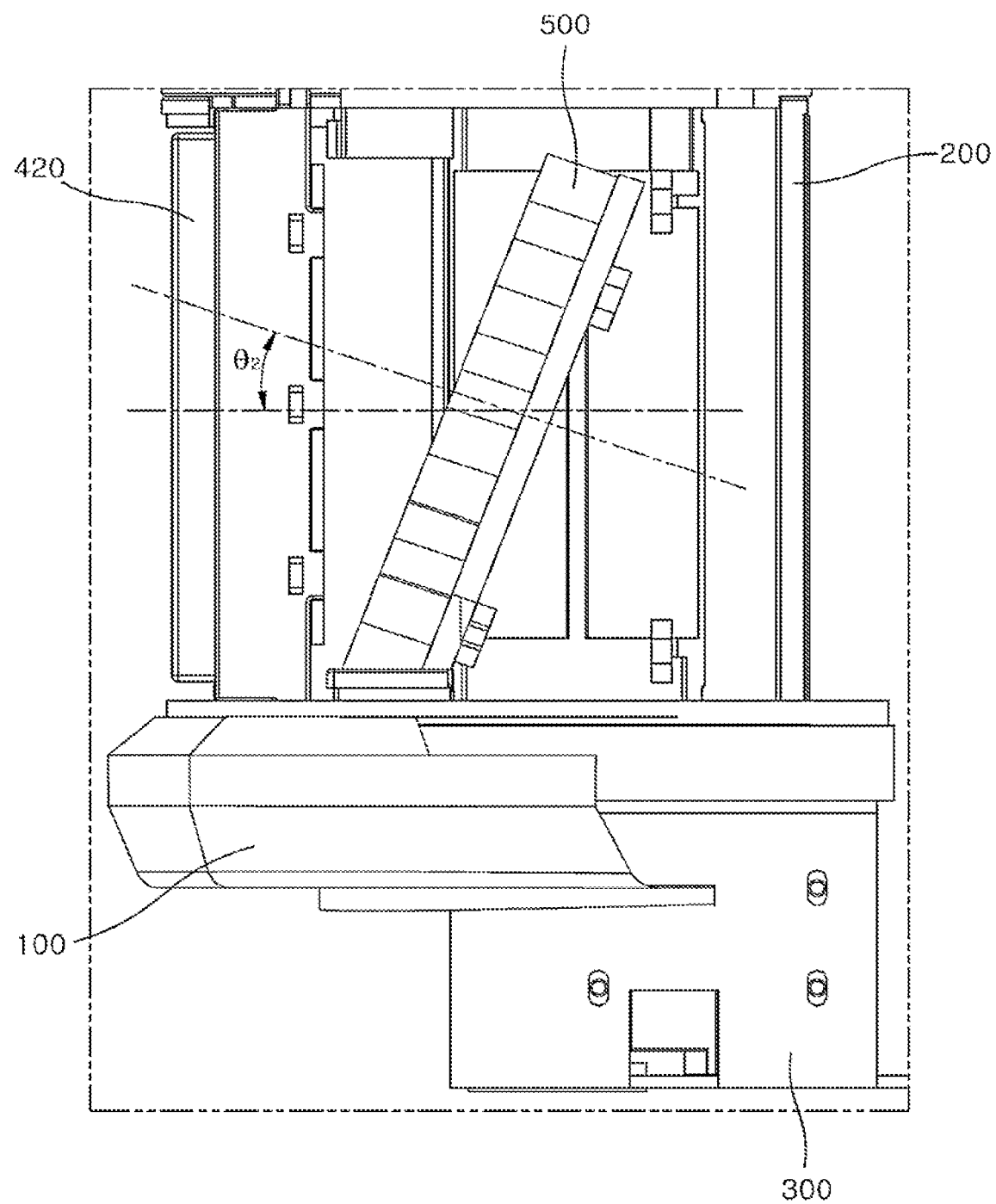
FIG. 7 is an enlarged view schematically illustrating a construction of a speaker unit according to an embodiment of the present disclosure.

FIG. 7 is an enlarged view schematically illustrating a construction of the speaker unit according to an embodiment of the present disclosure.

Referring to FIGS. 1 to 7, the speaker unit 500 according to an embodiment of the present disclosure may be a directional speaker that outputs an acoustic signal in a specific direction or at a certain angle to a specific direction. Accordingly, the speaker unit 500 can improve recognition efficiency and prevent the generation of noise by inducing a sound to be concentrated and output to an object to which an acoustic signal is to be transferred. The speaker unit 500 may be disposed to be located under the first lighting unit 410 within the second body 200. Furthermore, the speaker unit 500 may be disposed to be located under the second lighting unit 420 within the second body 200. The speaker unit 500 may be integrally coupled to the second body 200 by welding or may be detachably coupled to the second body 200 by bolting. The speaker unit 500 is disposed to be inclined at a given angle toward the upper side of the second body 200. That is, the speaker unit 500 is disposed so that a direction in which an acoustic signal is transferred is inclined at a given angle 82 upward from the direction transverse to the ground. Accordingly, the speaker unit 500 can improve transfer efficiency of an acoustic signal for a driver or pedestrian who recognizes a sound at a location relatively higher than the vehicle body 10.

The sensor unit 600 detects a state of the vehicle and surrounding information of the vehicle. That is, the sensor unit 600 functions as an element for collecting a variety of types of information for an operation of the control unit 700 that is described later.

The sensor unit 600 according to an embodiment of the present disclosure includes a driving detection sensor 610, an object detection sensor 620, a distance detection sensor 630, and a danger detection sensor 640.

Hereinafter, an example in which the sensor unit 600 includes all of the driving detection sensor 610, the object detection sensor 620, the distance detection sensor 630, and the danger detection sensor 640 will be described, but the sensor unit 600 is not limited to the example. The sensor unit 600 may include any one of the driving detection sensor 610, the object detection sensor 620, the distance detection sensor 630, and the danger detection sensor 640, a combination of two of them, or a combination of three of them.

The driving detection sensor 610 detects a driving state of the vehicle. For example, the driving detection sensor 610 detects a driving direction of the vehicle, a driving speed of the vehicle, whether the vehicle is traveling or has been stopped, a driving mode of the vehicle, etc. The driving detection sensor 610 converts a detected driving state of the vehicle into a form of an electrical signal, and transfers the electrical signal to the control unit 700 that is described later. The driving detection sensor 610 may be installed in the first body 100 or the second body 200 or may be installed at various locations of the vehicle body 10. The driving detection sensor 610 according to an embodiment of the present disclosure may include at least any one of a speed sensor, an inclination sensor, a weight sensor, a gyro sensor, a global positioning sensor (GPS), a geomagnetic sensor, and a current or voltage sensor for detecting a driving mode signal of the vehicle. Furthermore, it may be said to be natural that an element capable of additionally obtaining driving information of the vehicle is included in the driving detection sensor 610 although a sensor not described above is the element.

The object detection sensor 620 detects an object around the vehicle. In this case, the object may be exemplified as including all of a thing, a structure, etc. around the vehicle in addition to a movable object, such as a driver, a pedestrian, or an animal.

The object detection sensor 620 according to an embodiment of the present disclosure includes a LIDAR sensor 621 and a camera module 622.

The LIDAR sensor 621 obtains a three-dimensional (3-D) image around the vehicle by using laser light. The LIDAR sensor 621 may detect information on a location, distance, direction, speed, etc. of an object around the vehicle based on the obtained image. The LIDAR sensor 621 may be implemented by using a time of flight (TOF) method or a phase-shift method. The LIDAR sensor 621 may be installed in the first body 100. More specifically, the LIDAR sensor 621 may be disposed to be located over the third lighting unit 430 within the first body 100. The LIDAR sensor 621 may be formed in a plural number. The plurality of LIDAR sensors 621 may be disposed to be spaced apart from each other in the circumferential direction of the first body 100. Accordingly, the LIDAR sensor 621 can further expand the range in which an object around the vehicle can be recognized.

The camera module 622 captures an image around the vehicle. The camera module 622 may detect information on a location, distance, direction, speed, etc. of an object around the vehicle based on the obtained image. The camera module 622 may be at least any one of a mono camera, a stereo camera, and an around view monitoring (AVM) camera. The camera module 622 may be rotated along with the second body 200. More specifically, the camera module 622 is disposed to be located over the first lighting unit 410 within the second body 200. The camera module 622 may be integrally coupled to the second body 200 by welding or may be detachably coupled to the second body 200 by bolting.

Furthermore, it may be said to be natural that an element capable of additionally obtaining object information around the vehicle is included in the object detection sensor 620 although a sensor not described above is the element.

The distance detection sensor 630 detects a distance between the vehicle and a driver terminal. The driver terminal is an information communication terminal that is owned by a driver, and may be at least any one of a smartphone, a wearable terminal, a notebook, and a tablet PC capable of wireless communication. The distance detection sensor 630 includes a global positioning system (GPS), an infrared sensor, an antenna, etc., and may detect a relative azimuth and relative distance of a driver for the vehicle. The distance detection sensor 630 measures the intensity of a radio signal that is transmitted from the driver terminal to the control unit 700 that is described later, and may detect a distance between the vehicle and the driver terminal based on the measured intensity of the radio signal. Furthermore, when the control unit 700 receives an input signal, the distance detection sensor 630 may detect a distance between the vehicle and the driver terminal in a way to transmit a distance detection signal to the driver terminal and to receive a response signal for the distance detection signal from the driver terminal. The distance detection sensor 630 may be installed in the first body 100 or the second body 200 or may be installed at various locations of the vehicle body 10. Furthermore, it may be said to be natural that an element capable of additionally detecting a distance between the vehicle and the driver terminal is included in the distance detection sensor 630 although a sensor not described above is the element.

The danger detection sensor 640 detects a dangerous situation of the vehicle. More specifically, the danger detection sensor 640 detects a damage, intrusion, or theft condition for the vehicle by obtaining information on at least any one of an impact that is applied to the vehicle or whether a door of the vehicle has been opened. The danger detection sensor 640 according to an embodiment of the present disclosure may include at least any one of an impact sensor, an ultrasonic sensor, a tilt sensor, or a door opening and closing sensor. The danger detection sensor 640 may be installed in the first body 100 or the second body 200 or may be installed at various locations of the vehicle body 10. Furthermore, it may be said to be natural that an element capable of detecting a distance between the vehicle and the driver terminal is included in the danger detection sensor 640 although a sensor not described above is the element.

The control unit 700 determines an operation mode by receiving information detected by the detection unit 600 or an input signal from the driver terminal, and generally controls operations of the driving unit 300, the lighting unit 400, and the speaker unit 500 based on the determined operation mode. Additionally, the control unit 700 may control an operation of a brake apparatus, etc. of the vehicle. The operation mode that is determined by the control unit 700 may include a welcome mode, a parking location notification mode, a danger warning mode, a collision prevention mode, and a pedestrian guide mode. A detailed control operation of the control unit 700 according to each mode is described later.

The control unit 700 according to an embodiment of the present disclosure may be constructed to include at least any one of an electronic control unit (ECU), a central processing unit (CPU), a processor, or a system on chip (SoC). The control unit 700 may control a plurality of hardware or software components by operating an operating system or an application, and may perform various types of data processing and operations. The control unit 700 may be constructed to execute at least one instruction that is stored in memory and to store the resulting data of the execution in the memory. The control unit 700 may be constructed to include at least any one of a radio frequency (RF) device, a wireless fidelity (Wi-Fi) device, a Bluetooth device, a Zigbee device, and a near field communication (NFC) device in which various types of communication protocols capable of receiving an input signal that is generated by a terminal of a driver may be implemented.

Hereinafter, a method of controlling a lighting apparatus for a vehicle according to an embodiment of the present disclosure is described for each operation mode that is determined by the control unit 700.

Figure 8:
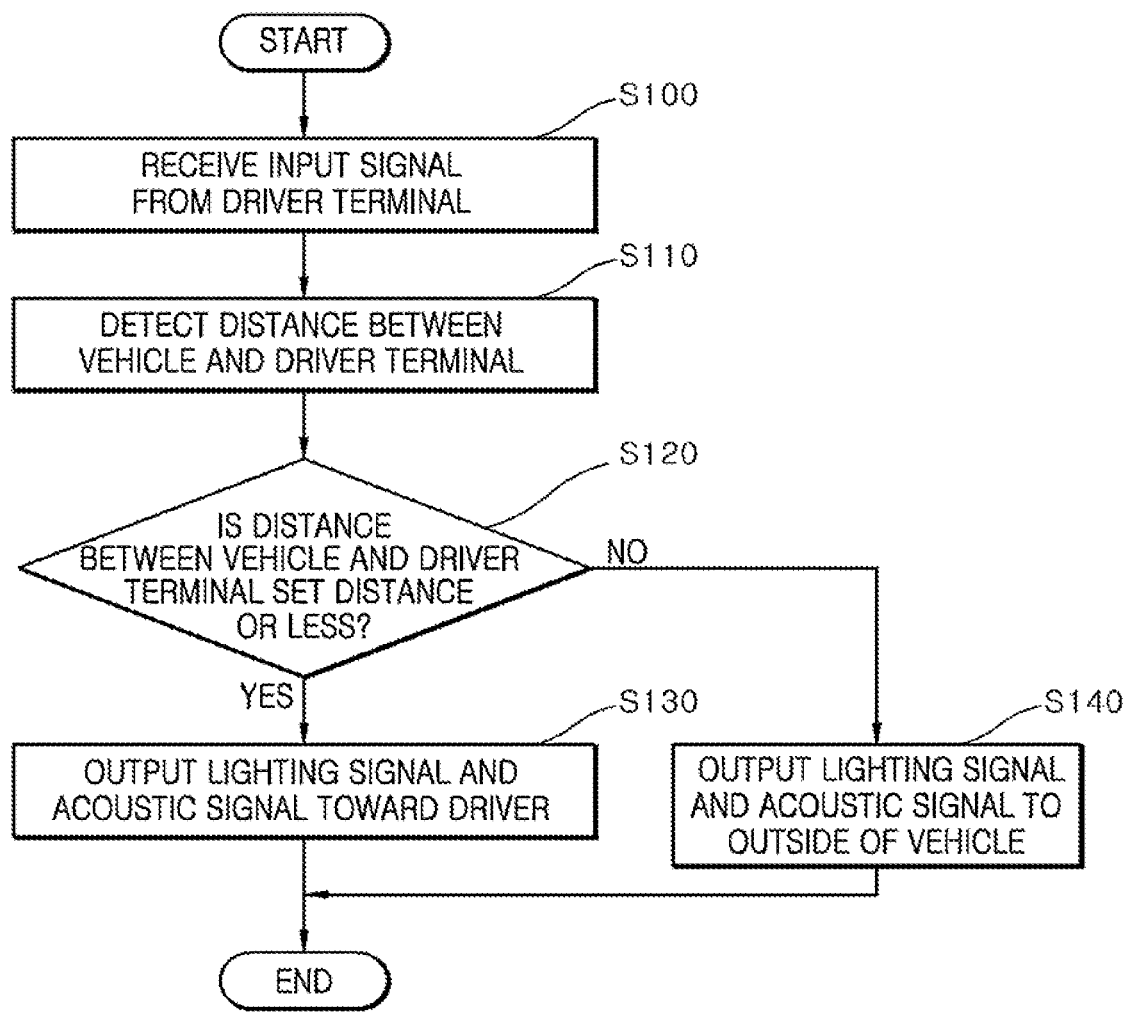
FIG. 8 is a flowchart schematically illustrating an operation sequence in which the lighting apparatus for a vehicle according to an embodiment of the present disclosure performs a welcome mode and a parking location notification mode.

FIG. 8 is a flowchart schematically illustrating an operation sequence in which the lighting apparatus for a vehicle according to an embodiment of the present disclosure performs the welcome mode and the parking location notification mode.

Referring to FIG. 8, in the state in which the vehicle has parked, the control unit 700 receives an input signal that is generated by a driver terminal (S100). In this case, the input signal may be exemplified as a door open signal, a start signal, etc.

Thereafter, the detection unit 600 detects a distance between the vehicle and the driver terminal (S110). More specifically, in step S110, the detection unit 600 may measure the intensity of a radio signal that is transmitted from the driver terminal to the control unit 700 by using the distance detection sensor 630, and may detect a distance between the vehicle and the driver terminal based on the measured intensity of the radio signal. Furthermore, when the control unit 700 receives the input signal, the distance detection sensor 630 may detect the distance between the vehicle and the driver terminal in a way to transmit a distance detection signal to the driver terminal and to receive a response signal for the distance detection signal from the driver terminal.

The control unit 700 determines whether the distance between the vehicle and the driver terminal, which is detected by the detection unit 600, is a set distance or less (S120). In this case, the set distance may be variously changed in design within the range of a distance in which a driver can easily identify a location of the vehicle with the naked eye.

When the distance between the vehicle and the driver terminal, which is detected by the detection unit 600, is the set distance or less, the control unit 700 outputs a lighting signal and an acoustic signal toward the driver by operating the driving unit 300, the lighting unit 400, and the speaker unit 500 (S130).

Figure 9:
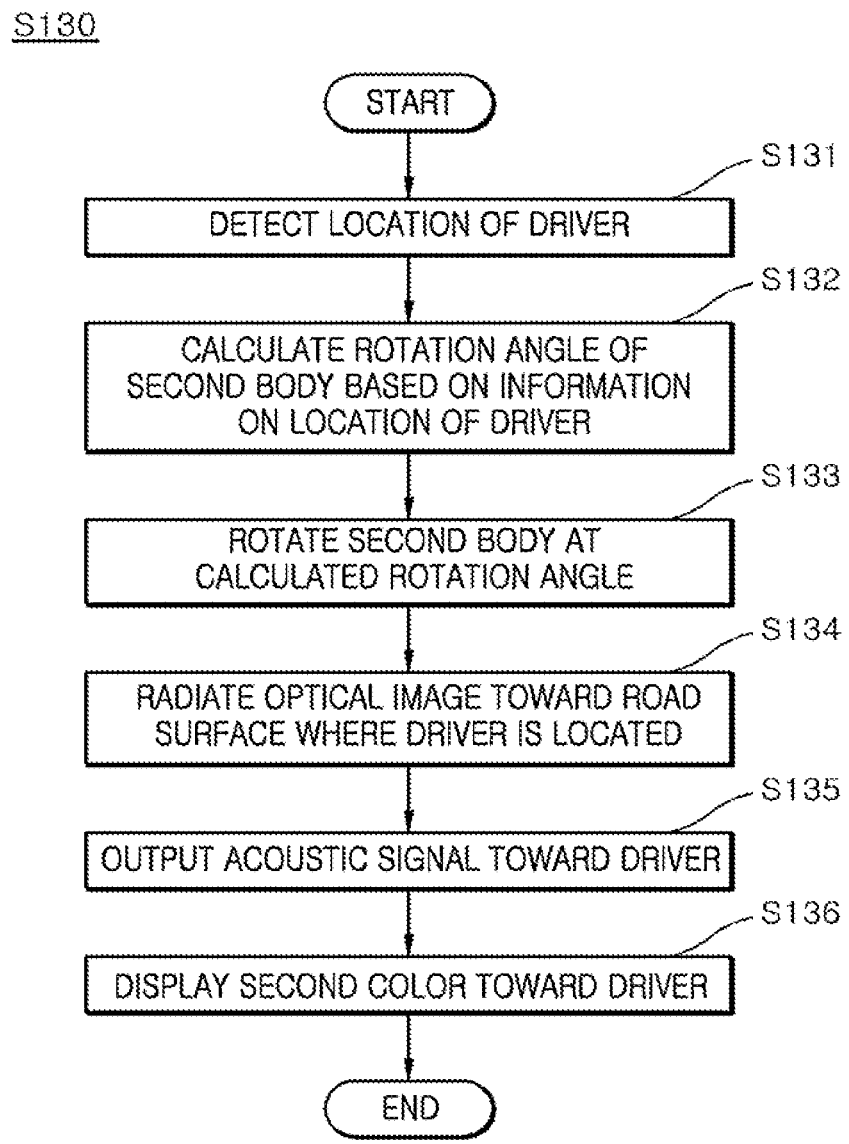
FIG. 9 is a flowchart schematically illustrating the sequence of step S130 according to an embodiment of the present disclosure.
Figure 10:
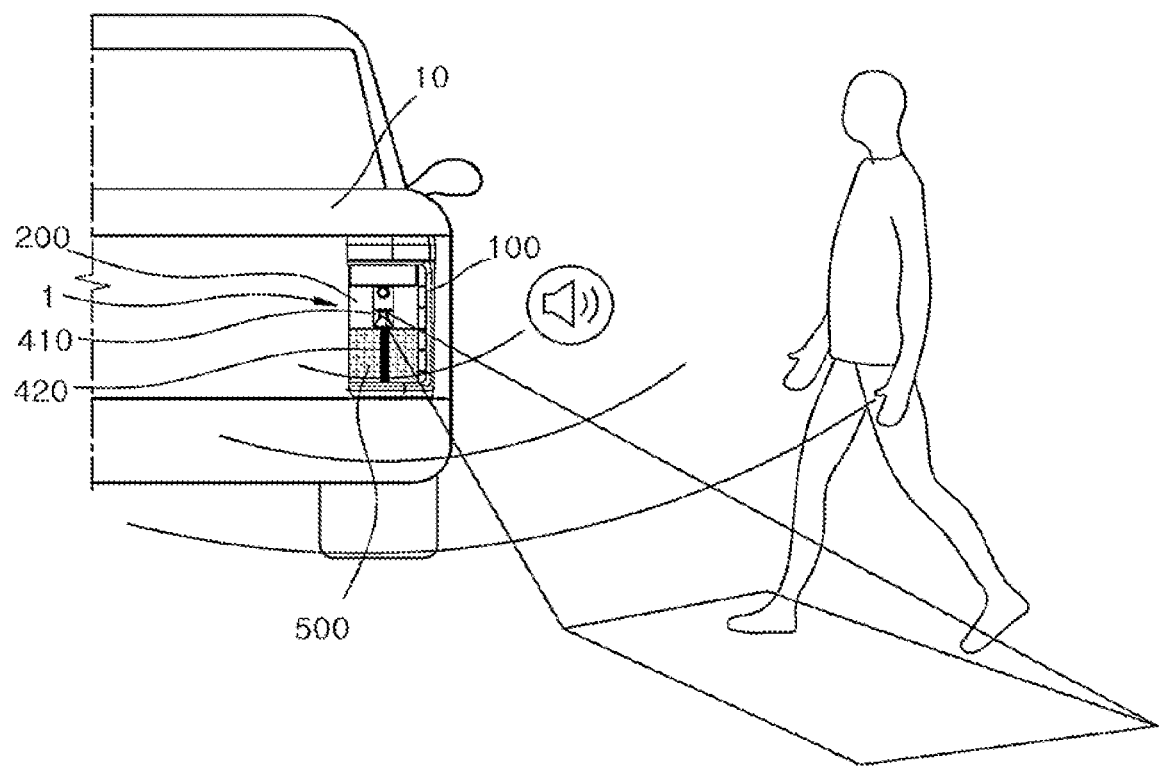
FIG. 10 is a diagram schematically illustrating an operating state of the lighting apparatus for a vehicle according to an embodiment of the present disclosure in step S130.

FIG. 9 is a flowchart schematically illustrating the sequence of step S130 according to an embodiment of the present disclosure. FIG. 10 is a diagram schematically illustrating an operating state of the lighting apparatus for a vehicle according to an embodiment of the present disclosure in step S130.

Step S130 is described more specifically with reference to FIGS. 9 and 10. The detection unit 600 detects a location of a driver who has approached within a set distance (S131). More specifically, in step S131, the detection unit 600 detects information on a location, distance, speed, etc. of the driver around the vehicle by using the LIDAR sensor 621 and camera module 622 of the object detection sensor 620.

Thereafter, the control unit 700 calculates a rotation angle of the second body 200 based on information on the location of the driver detected by the detection unit 600 (S132). More specifically, in step S132, the control unit 700 compares the location of the driver detected by the detection unit 600, and a current lighting radiation direction of the lighting unit 400 and a current acoustic output direction of the speaker unit 500, and calculates the rotation angle of the second body 200, which is necessary until the lighting radiation direction of the lighting unit 400 and the acoustic output direction of the speaker unit 500 are matched with the location of the driver detected by the detection unit 600.

Thereafter, the control unit 700 rotates the second body 200 at a rotation angle that is calculated by operating the driving unit 300 (S133).

Thereafter, the control unit 700 radiates an optical image toward a road surface where the driver is located by operating the first lighting unit 410 (S134). In step S134, the optical image that is radiated from the first lighting unit 410 toward the road surface may be various types of figures, symbols, pictures, or text, or a combination of them.

Furthermore, the control unit 700 outputs an acoustic signal toward the driver by operating the speaker unit 500 (S135). In step S135, the speaker unit 500 may output the acoustic signal, for example, "Hi driver name".

Furthermore, the control unit 700 displays a second color toward the driver by operating the second lighting unit 420 (S136).

Thereafter, the control unit 700 determines whether the driver has gotten in the vehicle based on the information detected by the detection unit 600.

When it is determined that the driver has gotten in the vehicle, the control unit 700 stops the operations of the driving unit 300, the lighting unit 400, and the speaker unit 500.

FIG. 9 illustrates an example in which steps S134, S135, and S136 are sequentially performed. However, steps S134, S135, and S136 are not limited to such contents, and may be simultaneously performed or may be performed in a different order.

When the distance between the vehicle and the driver terminal, which is detected by the detection unit 600, is greater than the set distance in step S120, the control unit 700 outputs a lighting signal and an acoustic signal to the outside of the vehicle by operating the lighting unit 400 and the speaker unit 500 (S140).

Figure 11:
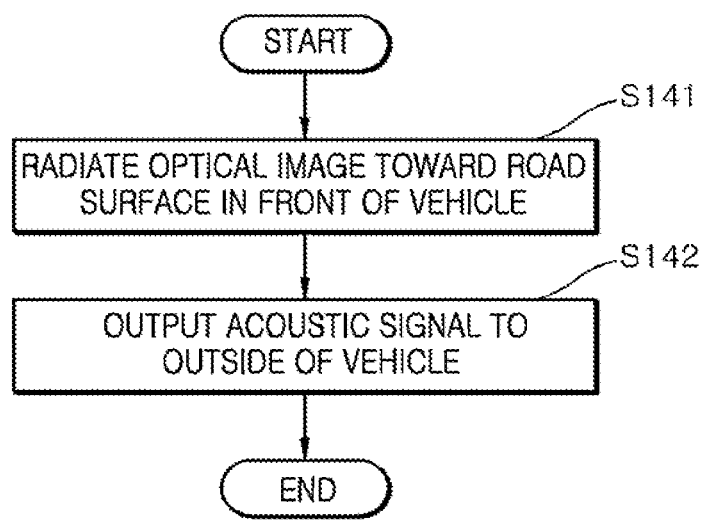
FIG. 11 is a flowchart schematically illustrating the sequence of step S140 according to an embodiment of the present disclosure.
Figure 12:
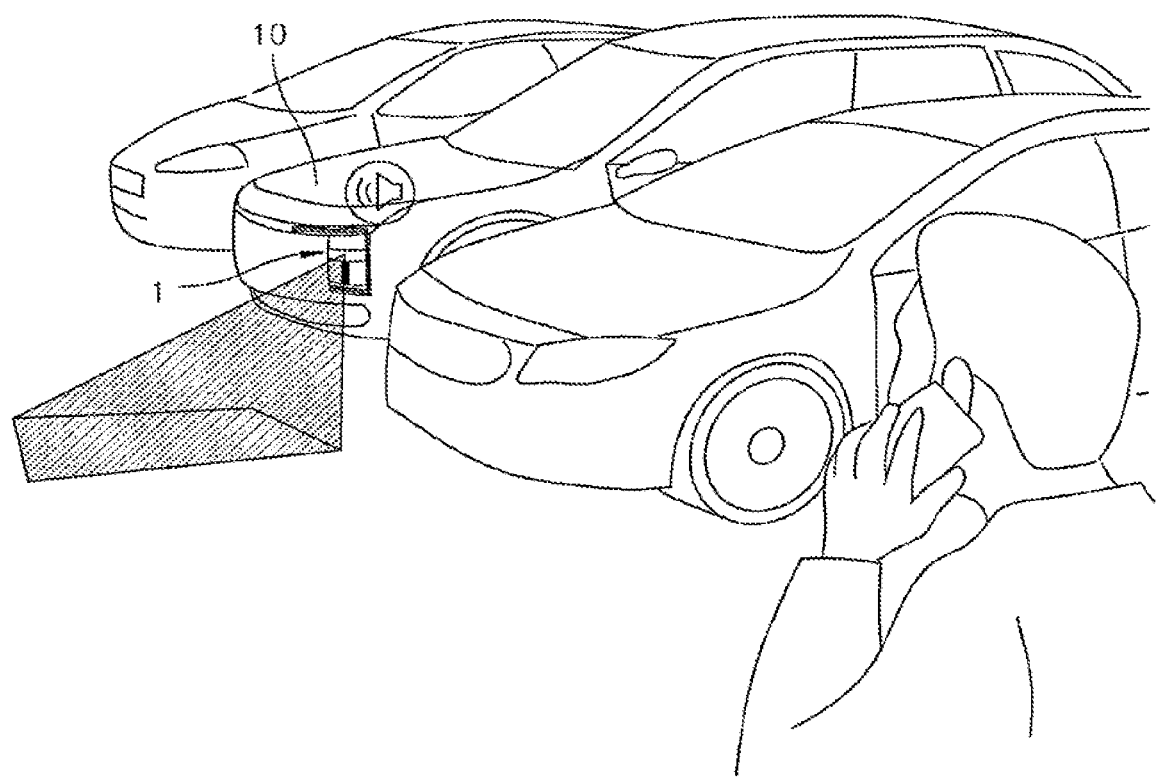
FIG. 12 is a diagram schematically illustrating an operating state of the lighting apparatus for a vehicle according to an embodiment of the present disclosure in step S140.

FIG. 11 is a flowchart schematically illustrating the sequence of step S140 according to an embodiment of the present disclosure. FIG. 12 is a diagram schematically illustrating an operating state of the lighting apparatus for a vehicle according to an embodiment of the present disclosure in step S140.

Step S140 is described more specifically with reference to FIGS. 11 and 12. The control unit 700 radiates an optical image toward a road surface where a driver is located by operating the first lighting unit 410 (S141). In step S141, the optical image that is radiated from the first lighting unit 410 toward the road surface may be various types of figures, symbols, pictures, or text, or a combination of them. Accordingly, a driver can easily identify the place where his or her own vehicle has parked based on an optical image displayed on a road surface even in a situation in which multiple vehicles have parked in a row.

Furthermore, the control unit 700 outputs an acoustic signal to the outside of the vehicle by operating the speaker unit 500 (S142). In step S142, the speaker unit 500 may output the acoustic signal, for example, "Hi driver name". Accordingly, a driver can easily identify the place where a vehicle has parked based on an acoustic signal displayed on a road surface even in a situation in which multiple vehicles have parked in a row.

Thereafter, when the distance between the vehicle and the driver terminal, which is detected by the detection unit 600, is the set distance or less, the control unit 700 may drive the driving unit 300, the lighting unit 400, and the speaker unit 500 so that step S130 is performed.

Figure 13:
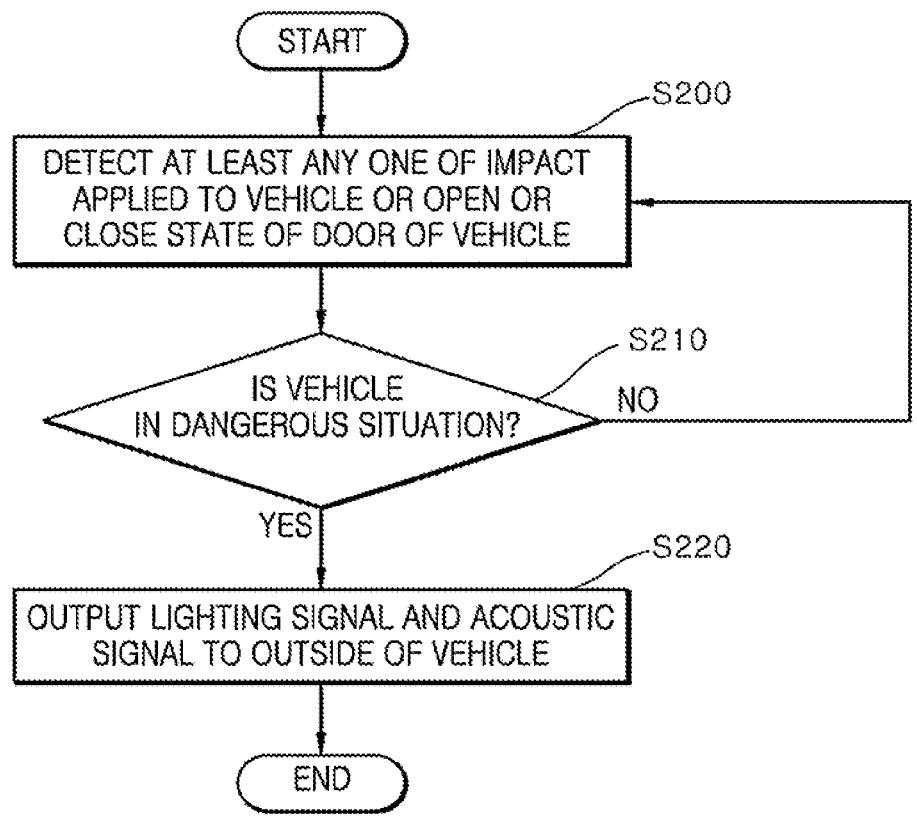
FIG. 13 is a flowchart schematically illustrating an operation sequence in which the lighting apparatus for a vehicle according to an embodiment of the present disclosure performs a danger warning mode.

FIG. 13 is a flowchart schematically illustrating an operation sequence in which the lighting apparatus for a vehicle according to an embodiment of the present disclosure performs the danger warning mode.

Referring to FIG. 13, first, the sensor unit 600 detects at least any one of an impact that is applied to the vehicle or the open or close state of a door of the vehicle by using the danger detection sensor 640 (S200).

Thereafter, the control unit 700 determines a dangerous situation of the vehicle based on the information detected by the sensor unit 600 (S210). More specifically, in step S210, the control unit 700 first determines whether the vehicle is turned on or off.

When the vehicle is turned off, the control unit 700 determines whether the size of the impact applied to the vehicle is greater than a set size. In this case, the size of the impact, that is, a determination criterion of the control unit 700, may be designed and changed into various values depending on an impact location of the vehicle or the type of vehicle.

Furthermore, the control unit 700 determines whether the door of the vehicle has been opened without permission, without an input signal from a driver terminal.

Thereafter, if any one of the conditions in which the size of the impact applied to the vehicle is greater than the set size and the door of the vehicle has been opened without permission, without the input signal from the driver terminal is satisfied, the control unit 700 determines that the vehicle is in the dangerous situation.

If it is determined that the vehicle is in the dangerous situation, the control unit 700 outputs a lighting signal and an acoustic signal to the outside of the vehicle by operating the driving unit 300, the lighting unit 400, and the speaker unit 500 (S220).

Figure 14:
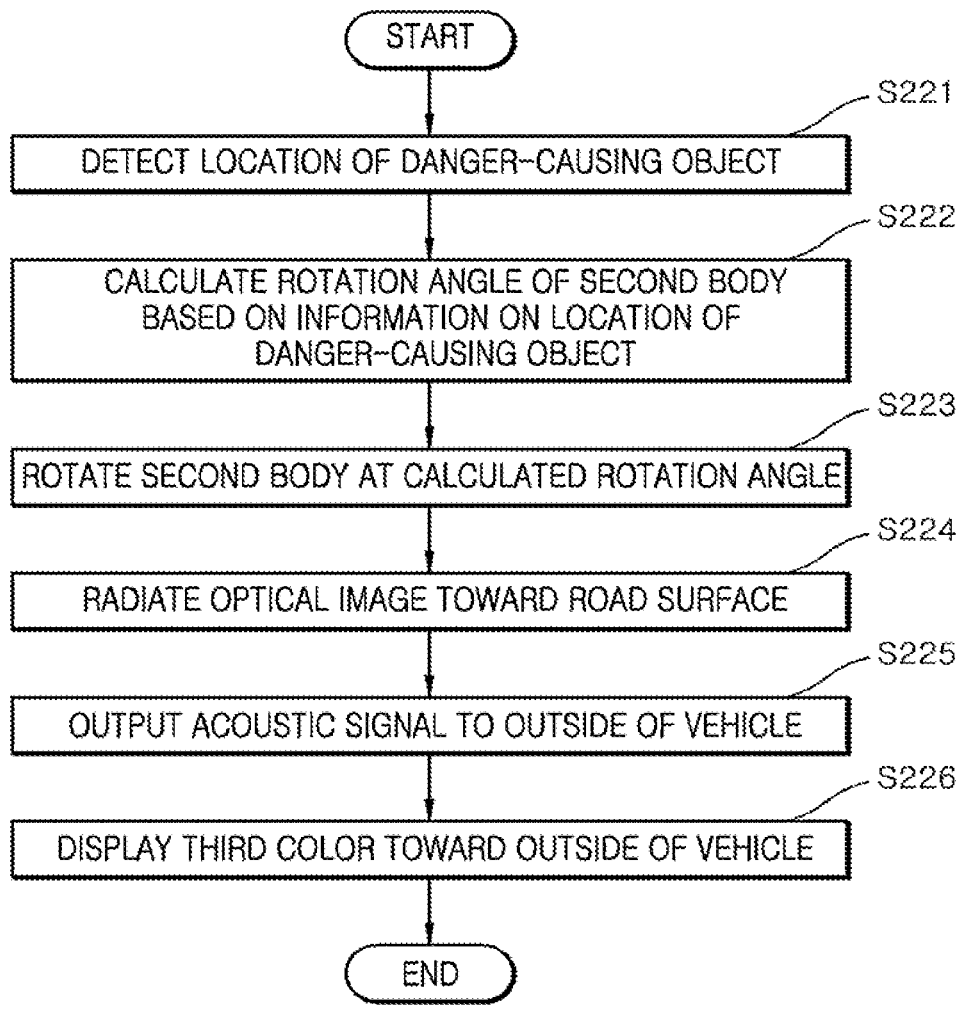
FIG. 14 is a flowchart schematically illustrating the sequence of step S220 according to an embodiment of the present disclosure.
Figure 15:
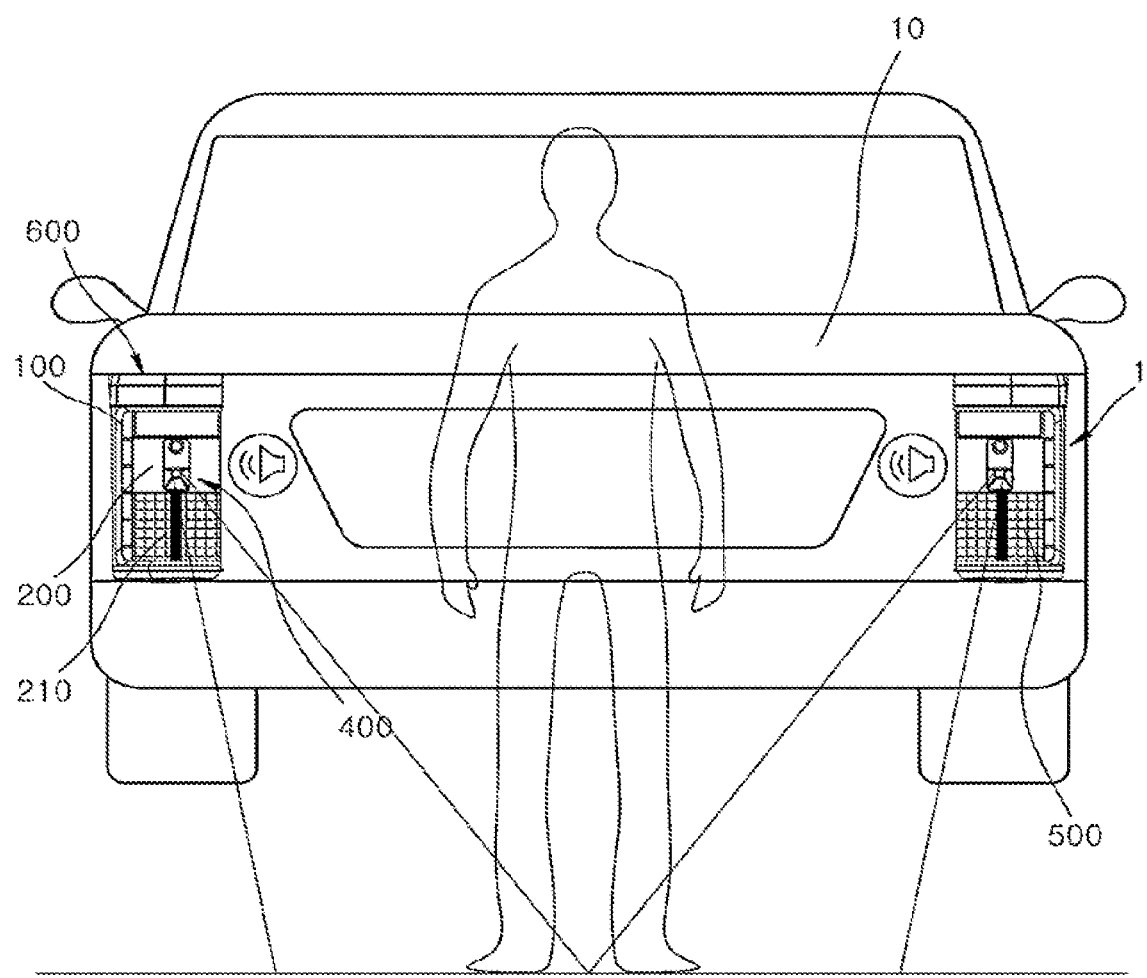
FIG. 15 is a diagram schematically illustrating an operating state of the lighting apparatus for a vehicle according to an embodiment of the present disclosure in step S220.

FIG. 14 is a flowchart schematically illustrating the sequence of step S220 according to an embodiment of the present disclosure. FIG. 15 is a diagram schematically illustrating an operating state of the lighting apparatus for a vehicle according to an embodiment of the present disclosure in step S220.

Step S220 is described more specifically with reference to FIGS. 14 and 15. The detection unit 600 detects a location of a danger-causing object that has approached within a set distance (S221). In this case, the danger-causing object means a movable object that is located closest to the vehicle among objects around the vehicle, which are detected by the detection unit 600 when the control unit 700 determines the dangerous situation, for example, a person or a vehicle. In step S221, the detection unit 600 detects information on a location, distance, speed, etc. of the danger-causing object that has been located around the vehicle by using the LIDAR sensor 621 and camera module 622 of the object detection sensor 620.

Thereafter, the control unit 700 calculates a rotation angle of the second body 200 based on the information on the location of the danger-causing object, which is detected by the detection unit 600 (S222). More specifically, in step S222, the control unit 700 compares the location of the danger-causing object detected by the detection unit 600, and a current lighting radiation direction of the lighting unit 400 and a current acoustic output direction of the speaker unit 500, and calculates the rotation angle of the second body 200 that is necessary until the lighting radiation direction of the lighting unit 400 and the acoustic output direction of the speaker unit 500 are matched with the location of the danger-causing object detected by the detection unit 600.

Thereafter, the control unit 700 rotates the second body 200 at the calculated rotation angle by operating the driving unit 300 (S223).

Thereafter, the control unit 700 radiates an optical image toward a road surface where the danger-causing object is located by operating the first lighting unit 410 (S224). In step S224, the optical image that is radiated from the first lighting unit 410 toward the road surface may be a figure, a symbol, a picture, or text that transfers a warning meaning, or a combination of them. In step S224, the control unit 700 may drive the first lighting unit 410 so that the optical image radiated by the first lighting unit 410 flickers.

Furthermore, the control unit 700 outputs an acoustic signal to the outside of the vehicle, more specifically toward the danger-causing object by operating the speaker unit 500 (S225). In step S225, the speaker unit 500 may output the acoustic signal, for example, "Warning" that transfers a warning meaning, for example.

Furthermore, the control unit 700 displays the third color toward the outside of the vehicle, more specifically, toward the danger-causing object by operating the second lighting unit 420 (S226). In step S226, the control unit 700 may drive the second lighting unit 420 so that the second lighting unit 420 displays the third color while flickering.

FIG. 14 illustrates an example in which steps S224, S225, and S226 are sequentially performed. However, steps S224, S225, and S226 are not limited to such contents, and may be simultaneously performed or may be performed in a different order.

Thereafter, the detection unit 600 detects a change in the location of the danger-causing object.

The control unit 700 determines whether to avoid the danger-causing object based on the changed location of the danger-causing object detected by the detection unit 600.

If it is determined that the avoidance of the danger-causing object has been completed, the control unit 700 stops the operations of the driving unit 300, the lighting unit 400, and the speaker unit 500.

Figure 16:
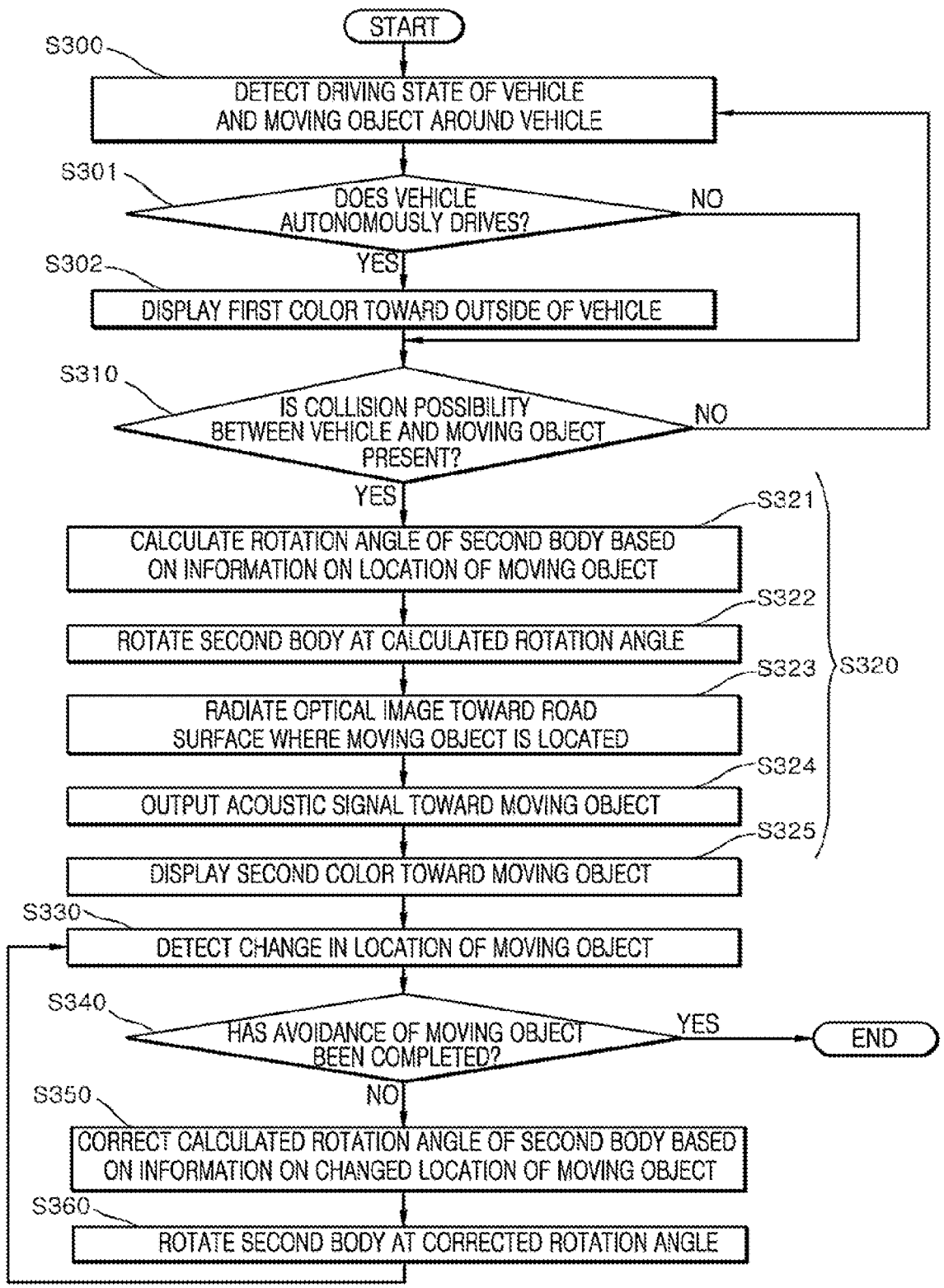
FIG. 16 is a flowchart schematically illustrating an operation sequence in which the lighting apparatus for a vehicle according to an embodiment of the present disclosure performs a collision prevention mode.
Figure 17:
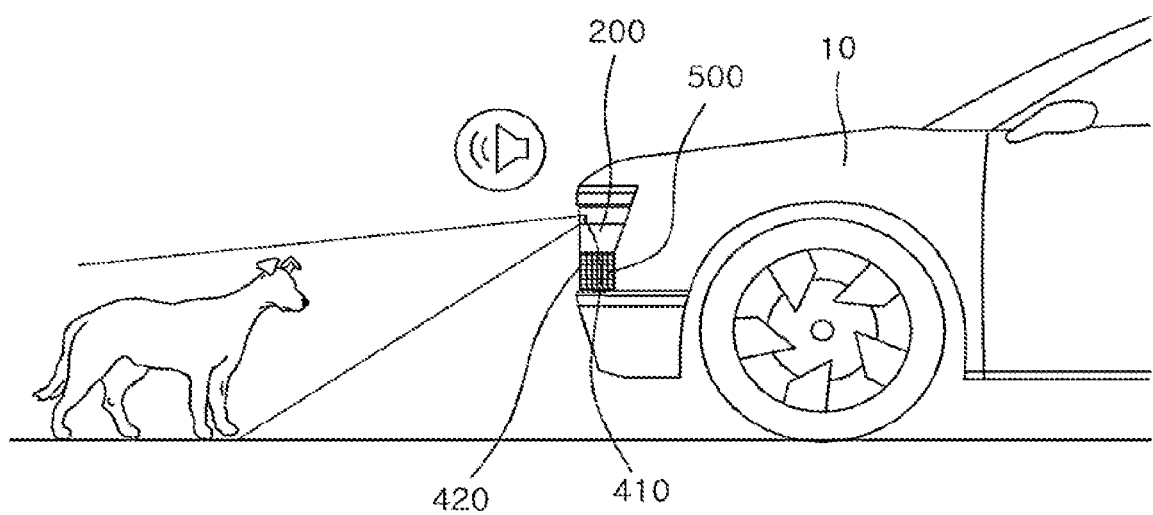
FIG. 17 is a diagram schematically illustrating an operating state of the lighting apparatus for a vehicle according to an embodiment of the present disclosure in step S320.

FIG. 16 is a flowchart schematically illustrating an operation sequence in which the lighting apparatus for a vehicle according to an embodiment of the present disclosure performs the collision prevention mode. FIG. 17 is a diagram schematically illustrating an operating state of the lighting apparatus for a vehicle according to an embodiment of the present disclosure in step S320.

Referring to FIGS. 16 and 17, first, the sensor unit 600 detects a driving state of the vehicle and a moving object around the vehicle (S300).

More specifically, in step S300, the sensor unit 600 detects a driving mode of the vehicle by using the driving detection sensor 610.

The control unit 700 determines whether the vehicle autonomously drives based on the information detected by the driving detection sensor 610 (S301).

If it is determined that the vehicle autonomously drives, the control unit 700 displays the first color toward the outside of the vehicle by operating the second lighting unit 420 (S302). Accordingly, a pedestrian outside the vehicle, a driver of another vehicle, etc. may easily recognize that the vehicle is now in the autonomous driving state.

If it is determined that the vehicle does not autonomously drive, the control unit 700 stops an operation of the second lighting unit 420.

Furthermore, in step S300, the sensor unit 600 detects a moving object around the vehicle by using the object detection sensor 620. The object detection sensor 620 may detect information on a location, distance, speed, etc. of the moving object around the vehicle through the LIDAR sensor 621 and the camera module 622. In this case, the moving object is an object which may be moved around the vehicle, and may be exemplified as a pedestrian, an animal, or a bicycle rider.

Thereafter, the control unit 700 determines a collision possibility between the vehicle and the moving object, based on the driving state of the vehicle and the information on the location of the moving object detected by the sensor unit 600 (S310). More specifically, in step S310, the control unit 700 determines whether the moving object is located on an expected driving path of the vehicle, based on a driving direction of the vehicle detected by the driving detection sensor 610 and a location and moving direction of the moving object detected by the object detection sensor 620.

In this process, the control unit 700 determines whether the distance between the vehicle and the moving object is a set distance or less.

If the vehicle has not been decelerated or has not braked by the driver even though the distance between the vehicle and the moving object becomes the set distance or less, the control unit 700 may slow down the vehicle or brake the vehicle by operating the brake apparatus of the vehicle.

If it is determined that the collision possibility between the vehicle and the moving object is present in step S310, the control unit 700 outputs a lighting signal and an acoustic signal toward the moving object by operating the driving unit 300, the lighting unit 400, and the speaker unit 500 (S320).

More specifically, the control unit 700 calculates a rotation angle of the second body 200 based on the information on the location of the moving object detected by the detection unit 600 (S321). More specifically, in step S321, the control unit 700 compares the location of the moving object detected by the detection unit 600, and a current lighting radiation direction of the lighting unit 400 and a current acoustic output direction of the speaker unit 500, and calculates the rotation angle of the second body 200 that is necessary until the lighting radiation direction of the lighting unit 400 and the acoustic output direction of the speaker unit 500 are matched with the location of the moving object detected by the detection unit 600.

Thereafter, the control unit 700 rotates the second body 200 at the calculated rotation angle by operating the driving unit 300 (S322).

Thereafter, the control unit 700 radiates an optical image toward a road surface where the moving object is located by operating the first lighting unit 410 (S323). In step S323, the optical image that is radiated from the first lighting unit 410 toward the road surface may be a figure, a symbol, a picture, or text that transfers a warning meaning, or a combination of them. In step S323, the control unit 700 may drive the first lighting unit 410 so that the optical image radiated by the first lighting unit 410 flickers.

Furthermore, the control unit 700 outputs an acoustic signal toward the moving object by operating the speaker unit 500 (S324). In step S324, the speaker unit 500 may output the acoustic signal, for example, "Warning" that transfers a warning meaning, for example.

Furthermore, the control unit 700 displays the second color toward the outside of the vehicle, more specifically, toward the moving object by operating the second lighting unit 420 (S325). In step S325, if the second lighting unit 420 displays the first color, the control unit 700 operates the second lighting unit 420 so that the first color displayed by the second lighting unit 420 is changed into the second color. Accordingly, the moving object around the vehicle can recognize that the vehicle now recognizes itself.

FIG. 16 illustrates an example in which steps S323, S324, and S325 are sequentially performed. However, steps S323, S324, and S325 are not limited to such contents, and may be simultaneously performed or may be performed in a different order.

Thereafter, the detection unit 600 detects a change in the location of the moving object (S330).

The control unit 700 determines whether the avoidance of the moving object has been completed based on a changed location of the moving object detected by the detection unit 600 (S340). In step S340, if it is determined that the moving object has deviated from an expected driving path of the vehicle, the control unit 700 may determine that the avoidance of the moving object has been completed.

If it is determined that the avoidance of the moving object has not been completed, the control unit 700 corrects the calculated rotation angle of the second body 200 based on the information on the changed location of the moving object (S350). Step S350 may be performed by using the same method as that of step S321.

Thereafter, the control unit 700 rotates the second body 200 at the corrected rotation angle by operating the driving unit 300 (S360).

Thereafter, if it is determined that the avoidance of the moving object has been completed, the control unit 700 stops the operations of the driving unit 300, the lighting unit 400, and the speaker unit 500.

Figure 18:
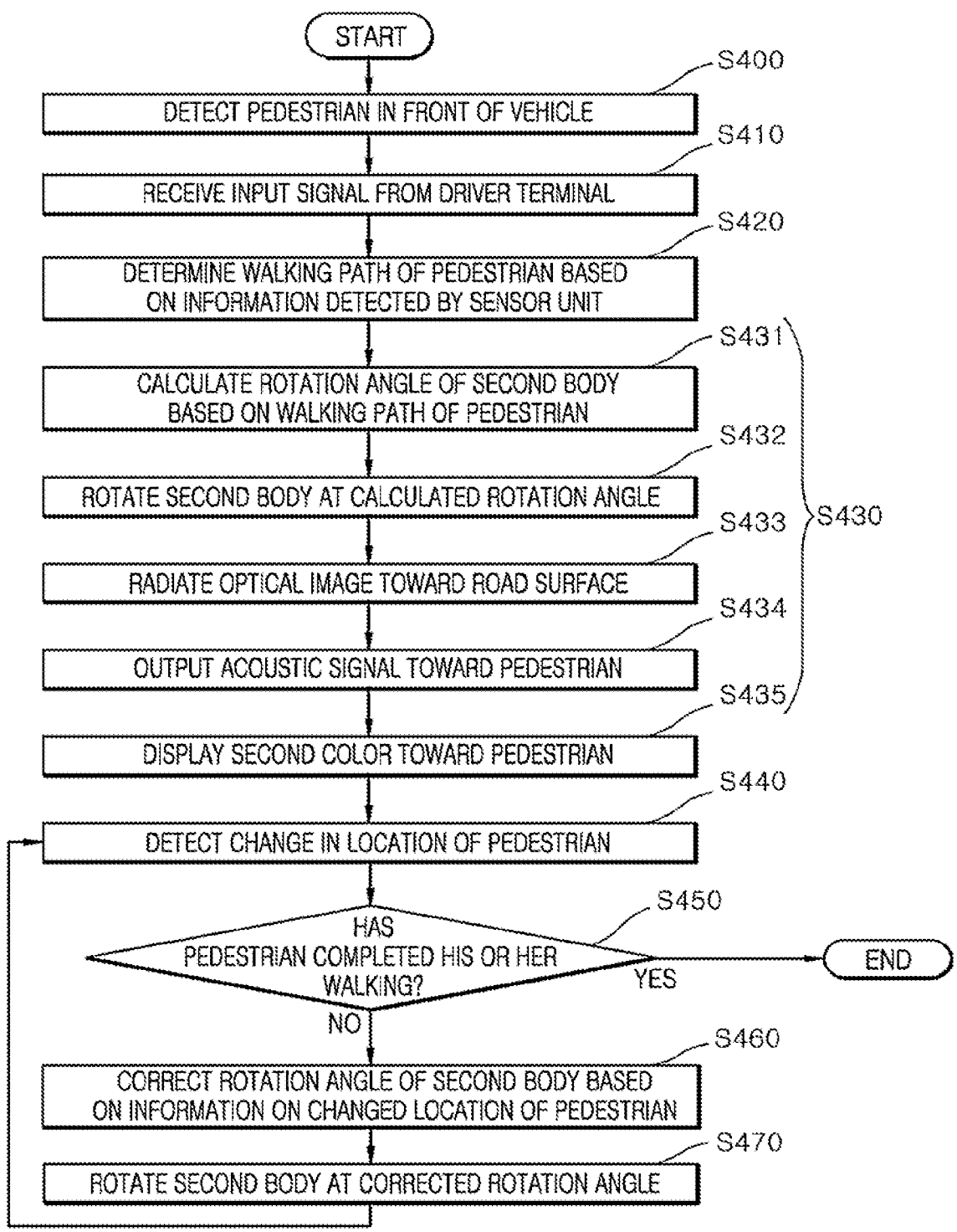
FIG. 18 is a flowchart schematically illustrating an operation sequence in which the lighting apparatus for a vehicle according to an embodiment of the present disclosure performs a walking guide mode.

FIG. 18 is a flowchart schematically illustrating an operation sequence in which the lighting apparatus for a vehicle according to an embodiment of the present disclosure performs the walking guide mode.

Referring to FIG. 18, first, the sensor unit 600 detects a pedestrian in front of the vehicle in the state in which the vehicle has been stopped (S400). More specifically, in step S400, the sensor unit 600 detects the pedestrian around the vehicle by using the object detection sensor 620. The object detection sensor 620 may detect information on a location, distance, speed, etc. of a moving object around the vehicle by using the LIDAR sensor 621 and the camera module 622.

Thereafter, the control unit 700 receives an input signal that is generated by a driver terminal (S410). The input signal generated in step S410 is a signal that instructs the control unit 700 to perform step S420 that is described later, and may be variously designed and changed within the range of a signal different from the input signal that is generated in step S100.

Thereafter, the control unit 700 determines a walking path of the pedestrian based on a location, moving direction, speed, etc. of the pedestrian detected by the sensor unit 600, more specifically, the object detection sensor 620 (S420).

After the walking path of the pedestrian is determined, the control unit 700 outputs a lighting signal and an acoustic signal toward the walking path of the pedestrian by operating the driving unit 300, the lighting unit 400, and the speaker unit 500 (S430).

More specifically, the control unit 700 calculates a rotation angle of the second body 200 based on the walking path of the pedestrian determined in step S420 (S431). More specifically, in step S431, the control unit 700 compares a determined expected walking path of the pedestrian, the location of the pedestrian detected by the detection unit 600, a current lighting radiation direction of the lighting unit 400, and a current acoustic output direction of the speaker unit 500, and calculates the rotation angle of the second body 200 that is necessary for the lighting radiation direction of the lighting unit 400 and the acoustic output direction of the speaker unit 500 to be directed toward the front in the walking direction of the pedestrian.

Thereafter, the control unit 700 rotates the second body 200 at the calculated rotation angle by operating the driving unit 300 (S432).

Thereafter, the control unit 700 radiates an optical image toward a road surface where the pedestrian is located by operating the first lighting unit 410 (S433).

Figure 19:
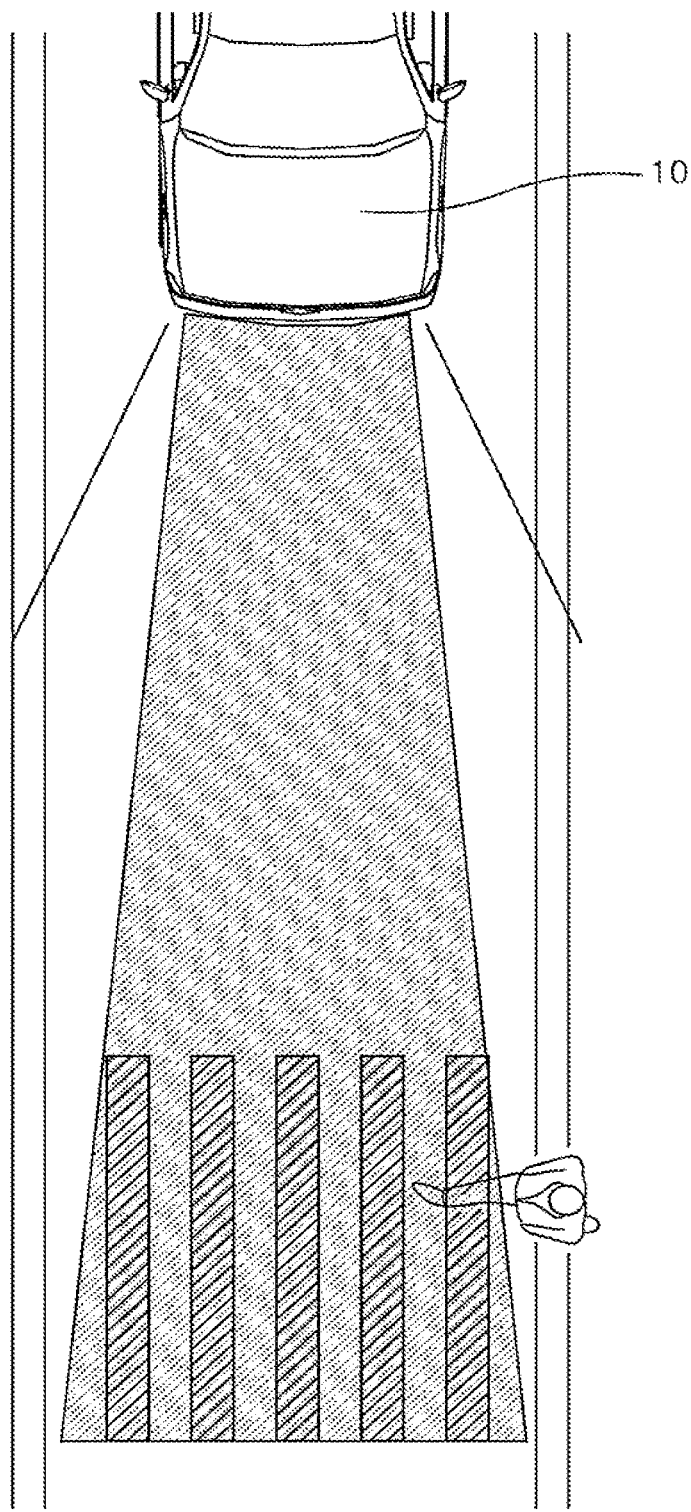
FIGS. 19 and 20 are diagrams illustrating optical images radiated from the first lighting unit toward a road surface in step S433 according to an embodiment of the present disclosure.
Figure 20:
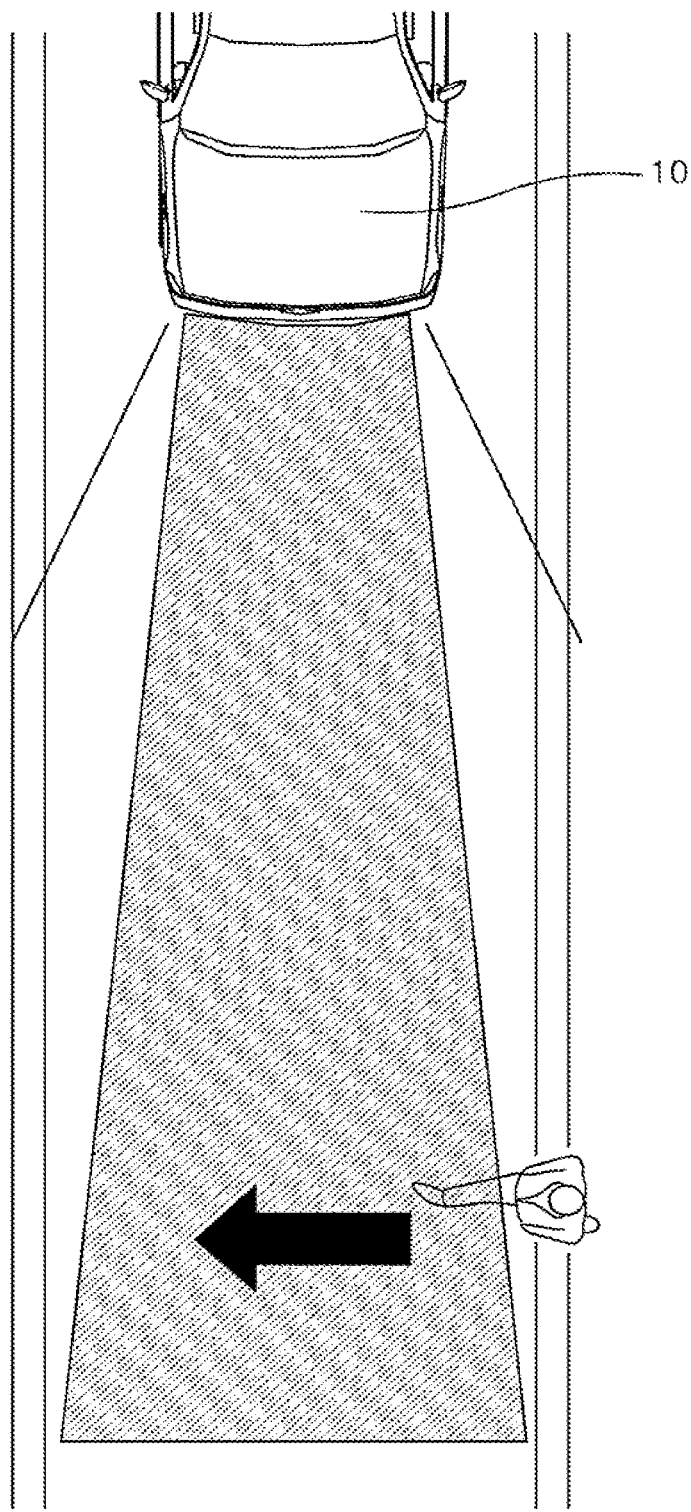

FIGS. 19 and 20 are diagrams illustrating optical images radiated from the first lighting unit toward a road surface in step S433 according to an embodiment of the present disclosure.

Furthermore, referring to FIG. 19, the optical image that is radiated from the first lighting unit 410 toward the road surface in step S433 may be a crosswalk shape. Accordingly, the first lighting unit 410 may provide a psychological safety feel to the pedestrian, and may enable a surrounding vehicle to easily recognize that the pedestrian is in a walking state.

Referring to FIG. 20, the optical image that is radiated from the first lighting unit 410 toward the road surface in step S433 may be an arrow shape toward a walking direction of the pedestrian. Accordingly, the first lighting unit 410 may provide the pedestrian with guidance to a walking direction in a situation in which surroundings are dark, such a night situation.

In contrast, the optical image that is radiated from the first lighting unit 410 toward the road surface may be a combination of the arrow shape and the crosswalk shape illustrated in FIGS. 19 and 20, and may be a separate symbol, figure, or picture in addition to the arrow shape and the crosswalk shape.

Furthermore, the control unit 700 outputs an acoustic signal toward the moving object by operating the speaker unit 500 (S434). In step S434, the speaker unit 500 may output the acoustic signal, such as "Left" or "Right" that indicates a walking direction, to a pedestrian, for example.

Furthermore, the control unit 700 displays the second color toward the outside of the vehicle, more specifically, a moving object by operating the second lighting unit 420 (S435). Accordingly, the second lighting unit 420 may provide a psychological safety feel to the pedestrian so that the pedestrian recognizes that the vehicle now recognizes himself or herself.

FIG. 18 illustrates an example in which steps S433, S434, and S435 are sequentially performed. However, steps S433, S434, and S435 are not limited to such contents, and may be simultaneously performed or may be performed in a different order.

Thereafter, the detection unit 600 detects a change in the location of the pedestrian (S440).

The control unit 700 determines whether the pedestrian has completed his or her walking based on the information on the changed location of the pedestrian detected by the detection unit 600 (S450). If it is determined that the pedestrian has deviated from the driving path of the vehicle in step S450, the control unit 700 may determine that the pedestrian has completed his or her walking.

If it is determined that the walking of the pedestrian has not been completed, the control unit 700 corrects the calculated rotation angle of the second body 200 based on the information on the changed location of the pedestrian (S460). Step S460 may be performed by using the same method as that of step S431.

Thereafter, the control unit 700 rotates the second body 200 at the corrected rotation angle by operating the driving unit 300 (S470).

Thereafter, if it is determined that the avoidance of the pedestrian has been completed, the control unit 700 stops the operations of the driving unit 300, the lighting unit 400, and the speaker unit 500.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments. Accordingly, the technical range of protection of the present disclosure should be determined by the claims below.

What is claimed is:
1. A lighting apparatus for a vehicle comprising:
a first body mounted on a vehicle body and having a first inner space and a first opening exposing the first inner space;

a second body disposed at the first inner space of the first body and having a second inner space and a second opening exposing the second inner space;
a driving unit configured to rotate the second body with respect to an axis perpendicular to a ground beneath the vehicle;
a lighting unit disposed at the second inner space of the second body and configured to radiate a lighting signal to an outside of the vehicle through the second opening; and
a speaker unit disposed at the second inner space of the second body and configured to output an acoustic signal to the outside of the vehicle through the second opening,
wherein the lighting unit and speaker unit are configured to rotate with respect to the axis when the second body is rotated by the driving unit.

2. The lighting apparatus of claim 1, further comprising:
a sensor unit configured to detect a state of the vehicle and surrounding information of the vehicle; and
a control unit configured to control, based on the detected state of the vehicle and surrounding information of the vehicle, the driving unit, the lighting unit, and the speaker unit.

3. The lighting apparatus of claim 2, wherein the sensor unit comprises at least one of:
a driving detection sensor configured to detect a driving state of the vehicle;
an object detection sensor configured to detect an object around the vehicle;
a distance detection sensor configured to detect a distance between the vehicle and a driver terminal; and
a danger detection sensor configured to detect a dangerous situation of the vehicle.

4. The lighting apparatus of claim 3, wherein the object detection sensor comprises:
a plurality of LIDAR sensors fixed to the first body and configured to obtain a three-dimensional (3-D) image around the vehicle; and
a camera module rotated along with the second body and configured to capture an image around the vehicle.

5. The lighting apparatus of claim 4, wherein the plurality of the LIDAR sensors are spaced apart from each other in a circumferential direction of the first body.

6. The lighting apparatus of claim 1, wherein the lighting unit comprises:
a first lighting unit coupled to the second body and configured to radiate an optical image toward a road surface; and
a second lighting unit coupled to the second body and configured to display a prescribed color toward the outside of the vehicle.

7. The lighting apparatus of claim 6, wherein the first lighting unit is inclined at a given angle toward a lower side of the second body.

8. The lighting apparatus of claim 6, wherein the lighting unit further comprises:
a third lighting unit coupled to the first body and configured to form a beam pattern toward the outside of the vehicle.

9. The lighting apparatus of claim 1, further comprising a grill unit at least partially covering the second opening of the second body, wherein the lighting signal radiated by the lighting unit and the acoustic signal output by the speaker unit are transmitted toward an outside of the second body through the grill unit.

10. The lighting apparatus of claim 1, wherein the speaker unit is inclined toward an upper side of the second body.

11. A method of controlling the lighting apparatus of claim 2, the method comprising:
detecting, using the sensor unit, the surrounding information including a pedestrian located in front of the vehicle;
determining, based on the detected surrounding information, a walking path of the pedestrian in front of the vehicle;
controlling the lighting unit to output the lighting signal to the determined walking path of the pedestrian; and
controlling the speaker unit to output the acoustic signal to the determined walking path of the pedestrian.

12. The method of claim 11, wherein controlling the lighting unit and the speaker unit to respectively output the lighting signal and the acoustic signal to the determined walking path of the pedestrian comprises:
calculating a rotation angle of the second body based on the determined walking path of the pedestrian;
rotating the second body with respect to the axis at the calculated rotation angle; and
upon the second body being rotated at the calculated rotation angle, performing:
radiating the light signal including an optical image toward a portion of a road corresponding to the determined walking path of the pedestrian; and
outputting the acoustic signal toward the determined walking path of the pedestrian.

13. The method of claim 12, further comprising:
detecting a change in a location of the pedestrian;
determining whether a walking of the pedestrian has been completed;
in response to determining that the walking of the pedestrian has not been completed, correcting the calculated rotation angle of the second body based on the changed location of the pedestrian; and
rotating the second body with respect to the axis at the corrected calculated rotation angle.

14. A method of controlling the lighting apparatus of claim 2, the method comprising:
detecting, using the sensor unit, (1) the state of the vehicle including a driving state of a vehicle and (2) the surrounding information of the vehicle including a location of a moving object around the vehicle;
determining a collision possibility between the vehicle and the moving object based on the driving state of the vehicle and the location of the moving object; and
in response to determining that the collision possibility between the vehicle and the moving object is present, performing:
controlling the lighting unit to output the lighting signal the moving object; and
controlling the speaker unit to output the acoustic signal toward the moving object.

15. The method of claim 14, wherein controlling the lighting unit and the speaker unit to respectively output the lighting signal and the acoustic signal toward the moving object comprises:
calculating, based on the location of the moving object around the vehicle, a rotation angle of the second body;
rotating the second body with respect to the axis at the calculated rotation angle;
controlling the lighting unit to output the light signal including an optical image toward a portion of a road surface corresponding to the location of the moving object; and controlling the speaker unit to output the acoustic signal toward the moving object.

16. The method of claim 15, further comprising:

detecting a change in the location of the moving object; and determining, based on the detected change in the location of the moving object, whether an avoidance of a collision between the vehicle and the moving object has been completed.

17. The method of claim 16, further comprising:

in response to determining that the avoidance of the collision between the vehicle and the moving object has not been completed, correcting the calculated rotation angle of the second body; and rotating the second body with respect to the axis at the corrected calculated rotation angle.

\* \* \* \* \*